United States Patent
Bruwer et al.

(10) Patent No.: US 9,275,316 B2
(45) Date of Patent: Mar. 1, 2016

(54) METHOD, APPARATUS AND SYSTEM FOR GENERATING AN ATTRIBUTE MAP FOR PROCESSING AN IMAGE

(71) Applicant: CANON KABUSHIKI KAISHA, Tokyo (JP)

(72) Inventors: Christian Bruwer, Westmead (AU); David Karlov, Emu Plains (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/520,902

(22) Filed: Oct. 22, 2014

(65) Prior Publication Data
US 2015/0116782 A1  Apr. 30, 2015

(30) Foreign Application Priority Data
Oct. 24, 2013 (AU) .................... 2013248213

(51) Int. Cl.
*H04N 1/405* (2006.01)
*G06K 15/02* (2006.01)
*G06T 11/00* (2006.01)
*H04N 1/40* (2006.01)

(52) U.S. Cl.
CPC .......... *G06K 15/1877* (2013.01); *G06K 15/181* (2013.01); *G06K 15/1807* (2013.01); *G06T 11/00* (2013.01); *H04N 1/40* (2013.01); *G06K 15/1852* (2013.01)

(58) Field of Classification Search
CPC ............ G06K 9/00463; G06K 9/4642; G06K 9/4609; G06K 2009/4666; G06K 9/2063; G06K 9/6231; G06K 9/00456; G06T 7/0028; G06T 7/0081; G06T 7/0083; G06T 3/00; G06T 3/4038; H04N 2201/0081; H04N 1/3876
USPC ......... 358/1.9, 1.18, 3.28, 448, 468; 382/190, 382/195, 173, 180, 282, 284
See application file for complete search history.

(56) References Cited

U.S. PATENT DOCUMENTS

| | | | |
|---|---|---|---|
| 5,751,852 A * | 5/1998 | Marimont et al. | ............ 382/180 |
| 6,256,104 B1 | 7/2001 | Rumph | |
| 7,113,309 B2 | 9/2006 | Furuya | |
| 7,508,996 B2 | 3/2009 | Matsumoto et al. | |
| 8,179,403 B2 | 5/2012 | Nakamura | |
| 8,369,652 B1 * | 2/2013 | Khosla et al. | ................ 382/284 |
| 2002/0064307 A1 | 5/2002 | Koga | |
| 2003/0156757 A1 * | 8/2003 | Murakawa et al. | ........... 382/195 |
| 2007/0201752 A1 | 8/2007 | Gormish | |

(Continued)

*Primary Examiner* — Thomas D Lee
*Assistant Examiner* — Stephen M Brinich
(74) *Attorney, Agent, or Firm* — Canon USA, Inc. IP Division

(57) ABSTRACT

A method of generating an attribute map for processing an image. An image encoded into a plurality of segments is received. Each segment is characterized by a position within a base region associated with the image and is encoded according to a corresponding encoding format. A segment from the plurality of segments is decoded into a sub-image. The sub-image is associated with a combination operation and an attribute value derived based on at least one of a segment decoding format and a segment encoding format. The combination operation determines a process of combining the sub-image with the underlying base region. An information-carrying pixel value in the sub-image is determined based on the sub-image pixel content and the attribute value associated with the sub-image. The attribute map for processing the image is generated using the attribute value associated with the sub-image for at least one pixel of the attribute map.

25 Claims, 16 Drawing Sheets

(56) References Cited

U.S. PATENT DOCUMENTS

2008/0175476 A1   7/2008  Ohk
2008/0239401 A1  10/2008  Stevens
2010/0260417 A1  10/2010  Dai
2011/0069885 A1   3/2011  Malik

* cited by examiner

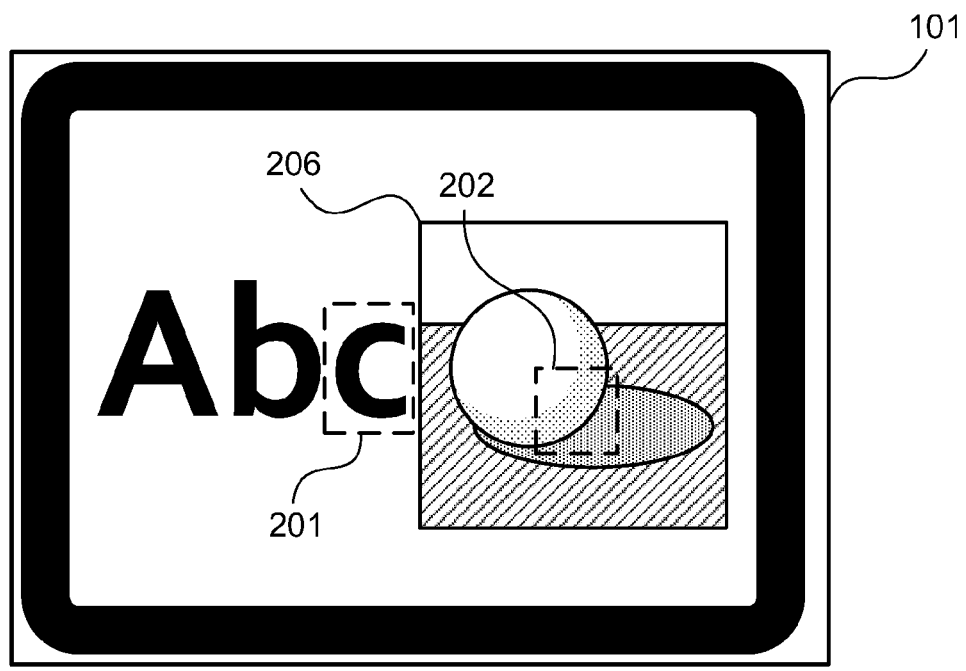
Fig. 2A
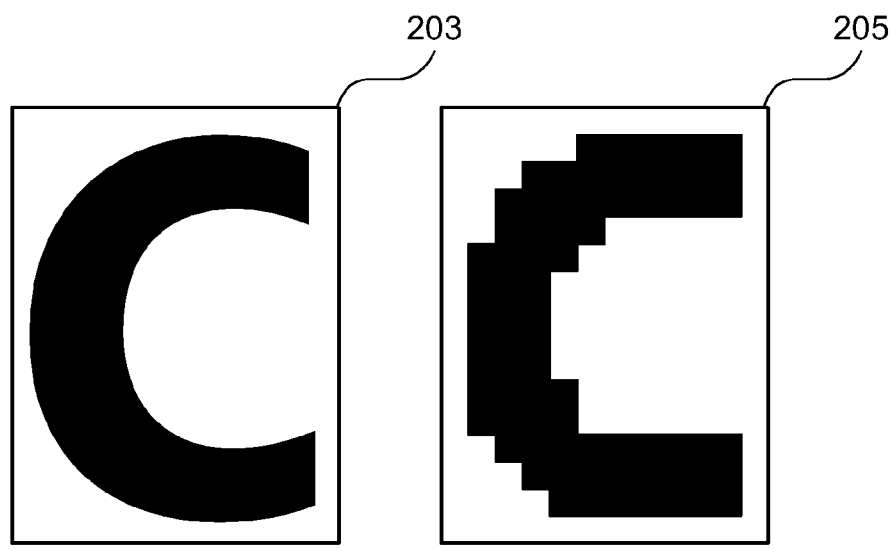
Fig. 2B  Fig. 2D

METHOD, APPARATUS AND SYSTEM FOR GENERATING AN ATTRIBUTE MAP FOR PROCESSING AN IMAGE

REFERENCE TO RELATED PATENT APPLICATION(S)

This application claims the benefit under 35 U.S.C. §119 of the filing date of Australian Patent Application No. 2013248213, filed 24 Oct. 2013, hereby incorporated by reference in its entirety as if fully set forth herein.

TECHNICAL FIELD

The present invention relates generally to graphics processing and, in particular, to processing images encoded using the JBIG2 format as described below. The present invention also relates to a method, apparatus and system for generating an attribute map for processing an image, and to a computer program product including a computer readable medium having recorded thereon a computer program for generating an attribute map for processing an image.

BACKGROUND

When images that are embedded within a PDF document are placed on a page by a renderer, the renderer associates pixel-by-pixel "type" information for the whole area that the image covers. The type used for the association is typically "image" type, but whatever type is used, the type is always the same for the whole area covered by the image. A problem with this method arises when the image in question is of mixed content, such as a scanned document containing large areas of text as well as some image and graphic elements.

In one known rendering method, an attribute map is generated for the page being rendered, where the attribute map indicates only image content. The attribute map contains "type" information for every pixel of the page and is used for post rendering processing such as choosing a dithering algorithm and colour processing for an area when printing the page. As the attribute map indicates image data for the area covered by the image, dithering patterns suitable for printing image type data are chosen, which results in output artefacts if the image content is actually something else (e.g., text). To derive attribute information the image may be analysed using some form of image analysis algorithm, such as an OCR (optical character recognition) procedure. However, in most cases a page is rendered for printing in real-time. Additionally running a processor intensive procedure, such as OCR, potentially results in overall performance degradation during printing.

SUMMARY

It is an object of the present invention to substantially overcome, or at least ameliorate, one or more disadvantages of existing arrangements.

Disclosed are arrangements which seek to address the above problems by providing accurate attribute information derived in a non-CPU intensive way, allowing more appropriate dithering algorithms to be selected, without employing processor expensive image analysis methods of an image bitmap.

According to one aspect of the present disclosure, there is provided a method of generating an attribute map for processing an image, the method comprising:

receiving an image encoded into a plurality of segments, each segment being characterised by a position within a base region associated with the image and being encoded according to a corresponding encoding format;

decoding a segment from the plurality of segments into a sub-image, the sub-image being associated with a combination operation and an attribute value derived based on at least one of a segment decoding format and a segment encoding format, the combination operation determining a process of combining the sub-image with the underlying base region;

determining an information-carrying pixel value in the sub-image based on the sub-image pixel content and the attribute value associated with the sub-image; and generating the attribute map for processing the image, the attribute map being generated using the attribute value associated with the sub-image for at least one pixel of the attribute map.

According to another aspect of the present disclosure, there is provided a method of generating an attribute map for processing an image, the method comprising: receiving a plurality of image segments to be combined with a base region to produce said image, each segment being associated with a combination operation determining a process of combining the segments with the underlying base region, each segment being characterised by an attribute value derived based on a format used to produce the segment;

determining an information-carrying pixel value for one of said segments from the plurality of segments;

determining a target pixel in the attribute map corresponding to a pixel in said segment having a value which distinct from the information carrying pixel value; and generating an attribute map for processing the image using the attribute value associated with said one segment for at least one pixel of the attribute map, wherein generating comprises retaining an attribute value in the attribute map for said target pixel.

According to still another aspect of the present disclosure, there is provided an apparatus for generating an attribute map for processing an image, the apparatus comprising:

means for receiving an image encoded into a plurality of segments, each segment being characterised by a position within a base region associated with the image and being encoded according to a corresponding encoding format;

means for decoding a segment from the plurality of segments into a sub-image, the sub-image being associated with a combination operation and an attribute value derived based on at least one of a segment decoding format and a segment encoding format, the combination operation determining a process of combining the sub-image with the underlying base region;

means for determining an information-carrying pixel value in the sub-image based on the sub-image pixel content and the attribute value associated with the sub-image; and means for generating the attribute map for processing the image, the attribute map being generated using the attribute value associated with the sub-image for at least one pixel of the attribute map.

According to still another aspect of the present disclosure, there is provided an apparatus for generating an attribute map for processing an image, the apparatus comprising: means for receiving a plurality of image segments to be combined with a base region to produce said image, each segment being associated with a combination operation determining a process of combining the segments with the underlying base region, each segment being characterised by an attribute value derived based on a format used to produce the segment;

means for determining an information-carrying pixel value for one of said segments from the plurality of segments;

means for determining a target pixel in the attribute map corresponding to a pixel in said segment having a value which distinct from the information carrying pixel value; and means for generating an attribute map for processing the image using the attribute value associated with said one segment for at least one pixel of the attribute map, wherein at least an existing attribute value of the attribute map is retained for said target pixel.

According to still another aspect of the present disclosure, there is provided a system for generating an attribute map for processing an image, the system comprising:

a memory for storing data and computer program;

a processor coupled to said memory for executing said computer program, said computer program comprising instructions for:

receiving an image encoded into a plurality of segments, each segment being characterised by a position within a base region associated with the image and being encoded according to a corresponding encoding format;

decoding a segment from the plurality of segments into a sub-image, the sub-image being associated with a combination operation and an attribute value derived based on at least one of a segment decoding format and a segment encoding format, the combination operation determining a process of combining the sub-image with the underlying base region;

determining an information-carrying pixel value in the sub-image based on the sub-image pixel content and the attribute value associated with the sub-image; and generating the attribute map for processing the image, the attribute map being generated using the attribute value associated with the sub-image for at least one pixel of the attribute map.

According to still another aspect of the present disclosure, there is provided a system for generating an attribute map for processing an image, the system comprising:

a memory for storing data and computer program;

a processor coupled to said memory for executing said computer program, said computer program comprising instructions for:

receiving a plurality of image segments to be combined with a base region to produce said image, each segment being associated with a combination operation determining a process of combining the segments with the underlying base region, each segment being characterised by an attribute value derived based on a format used to produce the segment;

determining an information-carrying pixel value for one of said segments from the plurality of segments;

determining a target pixel in the attribute map corresponding to a pixel in said segment having a value which distinct from the information carrying pixel value; and generating an attribute map for processing the image using the attribute value associated with said one segment for at least one pixel of the attribute map, wherein at least an existing attribute value of the attribute map is retained for said target pixel.

According to still another aspect of the present disclosure, there is provided a computer readable medium having a computer program stored thereon for generating an attribute map for processing an image, the computer program comprising:

code for receiving an image encoded into a plurality of segments, each segment being characterised by a position within a base region associated with the image and being encoded according to a corresponding encoding format;

code for decoding a segment from the plurality of segments into a sub-image, the sub-image being associated with a combination operation and an attribute value derived based on at least one of a segment decoding format and a segment encoding format, the combination operation determining a process of combining the sub-image with the underlying base region;

code for determining an information-carrying pixel value in the sub-image based on the sub-image pixel content and the attribute value associated with the sub-image; and code for generating the attribute map for processing the image, the attribute map being generated using the attribute value associated with the sub-image for at least one pixel of the attribute map.

According to still another aspect of the present disclosure there is provided, a computer readable medium having a computer program stored thereon for method of generating an attribute map for processing an image, the program comprising:

code for receiving a plurality of image segments to be combined with a base region to produce said image, each segment being associated with a combination operation determining a process of combining the segments with the underlying base region, each segment being characterised by an attribute value derived based on a format used to produce the segment;

code for determining an information-carrying pixel value for one of said segments from the plurality of segments;

code for determining a target pixel in the attribute map corresponding to a pixel in said segment having a value which distinct from the information carrying pixel value; and code for generating an attribute map for processing the image using the attribute value associated with said one segment for at least one pixel of the attribute map, wherein at least an existing attribute value of the attribute map is retained for said target pixel.

According to still another aspect of the present disclosure, there is provided a method of generating an attribute map for processing an image, the method comprising:

receiving a plurality of image segments to be combined with a base region to produce said image, each segment being associated with a combination operation determining a process of combining the segments with the underlying base region, each segment being characterised by a segment attribute value derived based on a format used to produce the segment;

determining an information-carrying pixel and a non-information-carrying pixel for one of said segments from the plurality of segments;

determining a first pixel location corresponding to the information carrying pixel and a second location corresponding to the non-information carrying pixel; and generating the attribute map for processing the image using the segment attribute value for the first location and retaining an existing attribute value for the second location.

Other aspects of the invention are also disclosed.

BRIEF DESCRIPTION OF THE DRAWINGS

One or more embodiments of the invention will now be described with reference to the following drawings, in which:

FIG. 2A shows two areas highlighted within the image of FIG. 1A.

FIG. 2B shows a magnified area within a text portion of the example multi content image highlighted in FIG. 2A;

FIG. 2D shows a magnified area where text has pixelated edges as seen in conventional systems, within a text portion of the example multi content image highlighted in FIG. 2A;

FIG. 2C shows a magnified area within the halftoned natural image portion of the example multi content image in FIG. 2A;

DETAILED DESCRIPTION INCLUDING BEST MODE

Figure 1A:
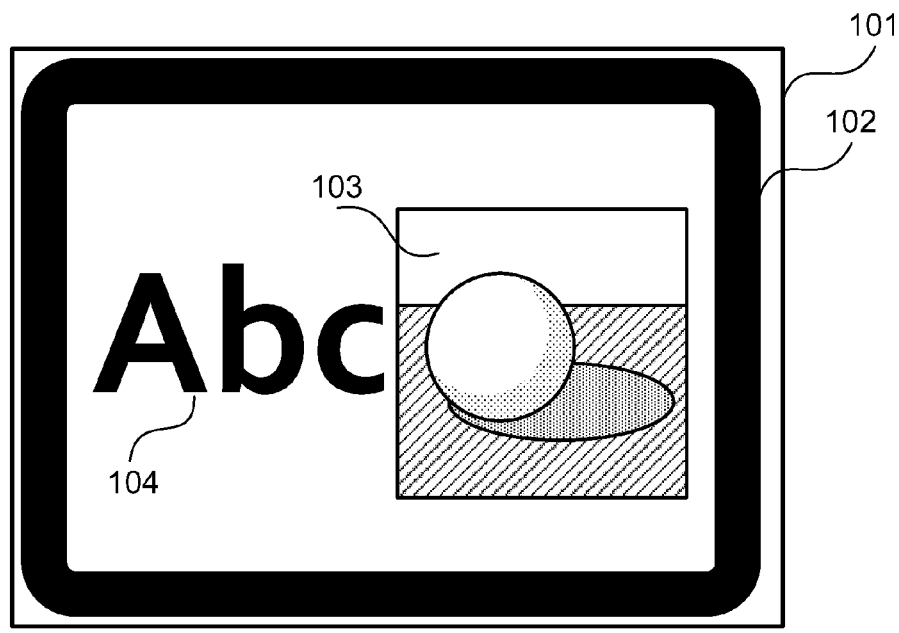
FIG. 1A shows an example mixed content black and white (bi-level) compressed image.

Where reference is made in any one or more of the accompanying drawings to steps and/or features, which have the same reference numerals, those steps and/or features have for the purposes of this description the same function(s) or operation(s), unless the contrary intention appears.

JBIG2 is an advanced compression format for 1-bit per pixel (bi-level) black and white images, developed by the Joint Bi-level Image Experts Group and published as ITU T.88 as well as ISO/IEC 14492:2001. A typical JBIG2 encoder decomposes an input bi-level image into several regions according to content, the regions having three basic content types: halftone regions, text regions and generic regions. A generic region is a region with content that is not found to clearly fit into the other two region types. A JBIG2 encoder determines the different types of content in an image and compresses each region type using a method most favourable to effectively compress that type of image data. The compressed regions are stored inside the JBIG2 file format as "segments", which when decoded into sub-bitmaps are composited with a "cumulative bitmap" using an OR, AND, XOR, XNOR or REPLACE combination operator specified by the associated segment header. The sub-bitmaps may also be referred to as "sub-images". Further, in JBIG2 terminology, the cumulative bitmap described above is referred to as a page.

The methods described below may be used for forming a decoded image from a JBIG2 compressed image by decoding the plurality of segments of the JBIG2 compressed image and combining associated sub-bitmaps according to a combination operator (i.e., representing a combination operation), a position and size of each segment. A sub-bitmap is combined in a pre-determined order with the cumulative bitmap by decoding the segments of the JBIG2 compressed image, the pre-determined order being defined during encoding of the JBIG2 compressed image. The pre-determined order in which the sub-bitmaps are combined with the cumulative bitmap corresponds to the order in which the segments appear in the JBIG2 compressed image file storing the JBIG2 compressed image. The sub-bitmaps may also be kept as intermediate buffers which are further refined before combining the sub-bitmaps with the cumulative bitmap.

A JBIG2 compressed image is decoded by starting with a blank bitmap, for which both the dimensions and the colour (either all white, or all black) are specified. The blank bitmap forms the background onto which the decoded image segments are placed using a specified combination operator representing a combination operation. The background is iteratively modified until all segments for a page have been decoded and combined with the background as specified. The background which is iteratively modified in the process of decoding the JBIG2 image is referred to as the cumulative bitmap as mentioned above.

In some cases, the width of a JBIG2 image is specified while the final height remains unknown until all segments of the JBIG2 compressed image have been decoded. In such cases, the image is striped. The same process is used for decoding a striped JBIG2 compressed image, with the difference being that the JBIG2 compressed image is decoded a stripe at a time, where each of the dimensions of each stripe are known up front as the width is specified and a default height is provided. Decoding a stripe is complete when an end-of-stripe segment is encountered at which point a new stripe is started. The end-of-stripe segment provides the actual height of the completed stripe, which may be less (resulting in the stripe being shortened) than the default size of the stripe specified initially. When dealing with striped images, the cumulative bitmap refers to the current stripe being decoded. The final image (when all the segments have been processed) is then formed by stitching the stripes together in the order that the stripes were decoded thereby forming a single large bitmap.

FIG. 1A shows an example of a typical bi-level image 101, which contains several distinct image regions: a region containing text 104, a region containing a halftoned natural image 103, and a frame 102, deemed to be of type "graphics". The example image 101 may be decomposed into three distinct regions when compressed by a JBIG2 encoder using text region encoding for the region 104, halftone region encoding for the region 103 and region 102 using generic region encoding. The regions can be overlapping and combined using a combination operator representing a combination operation used to avoid graphic elements affecting each other. For example, an OR operator may be used to combine the regions.

Figure 1B:
FIG. 1B shows an attribute bitmap generated when rendering a page in a PDF document in conventional systems that contains a single page sized image such as the image shown in FIG. 1A.

A typical format used when printing is the PDF (Portable Document Format) document format. When rendering a PDF page, a typical printer or printer driver generates rasterized pixel data, typically in the form of a bitmap, as well as corresponding rasterized type attribute information (i.e., attribute values) associated with each pixel. The rasterized pixel data bitmap is hereafter referred to as an "attribute map", which specifies a categorization of the corresponding pixel as into a "type" such as text, line, graphics or image. Some arrangements may have further types besides those mentioned by way of example. The attribute information can be interleaved with the same raster data similar to a colour channel or attribute information can be provided as a separate bitmap comprising attribute values. Some PDF documents may contain pages with embedded image content, in some cases of a single image which covers the entire page. Pages with embedded image content are in fact typical when PDF is used as a container for scanned documents. Conventionally, the attribute map (or "attribute bitmap"), such as the attribute map 105 seen in FIG. 1B, is generated for a page in a PDF consisting of a single image (e.g., the example image 101). In the example of FIG. 1B, the generated attribute map 105 has erroneously the same type information ("image") for all pixels of the image 101, regardless of the fact that some areas (e.g. 104) correspond to text or linework.

The attribute map is used for various post-render colour processing (colour correction, colour conversion, n-level processing, etc) operations and for example screen processing where pixels having an image attribute for which halftone stability is important in a printer using an electro-photographic process or the like. Image data may be digitized using a coarse screen pattern so that signals are concentrated at highlighted portions. On the other hand, for pixels having a "character" attribute, the readability of low-contrast text may be improved using a fine screen pattern, while compromising the halftone stability.

FIG. 2A shows two highlighted regions 201 and 202 of the example image 101 of FIG. 1A, which will be used to illustrate the problem with conventional rendering systems and the advantage that is provided by the methods described below.

Images 203 and 205 respectively in FIG. 2B and FIG. 2D both show a zoomed in view of the letter "c" as highlighted by region 201. The image 205 shows the printed output of the letter "c" produced by a conventional system. Since conventional rendering systems treat all of the pixels as though the pixels were part of a single homogeneous image, the edges of the letter "c" in the image 205 appear highly pixelated as conventional rendering systems cannot know that different halftone screen patterns are required or that edges may require sharpening as all pixels in the image 205 have the image attribute and are therefore undistinguishable to such conventional rendering systems. Other artefacts that can be caused by failing to correctly identify object type include blurring of edges which should be sharp, and incorrect colour conversions.

The image 203, on the other hand, illustrates the improvement provided by the methods describe below. Pixels forming the "c" in the image 203 are marked by an associated attribute value as "text", while the white background has no associated attribute value set. Marking the pixels forming the "c" in the image 203 with an attribute value as "text" allows conventional post rendering processing as is commonly used in printing devices to sharpen edges and to choose screen patterns appropriate for text.

Figure 2C:
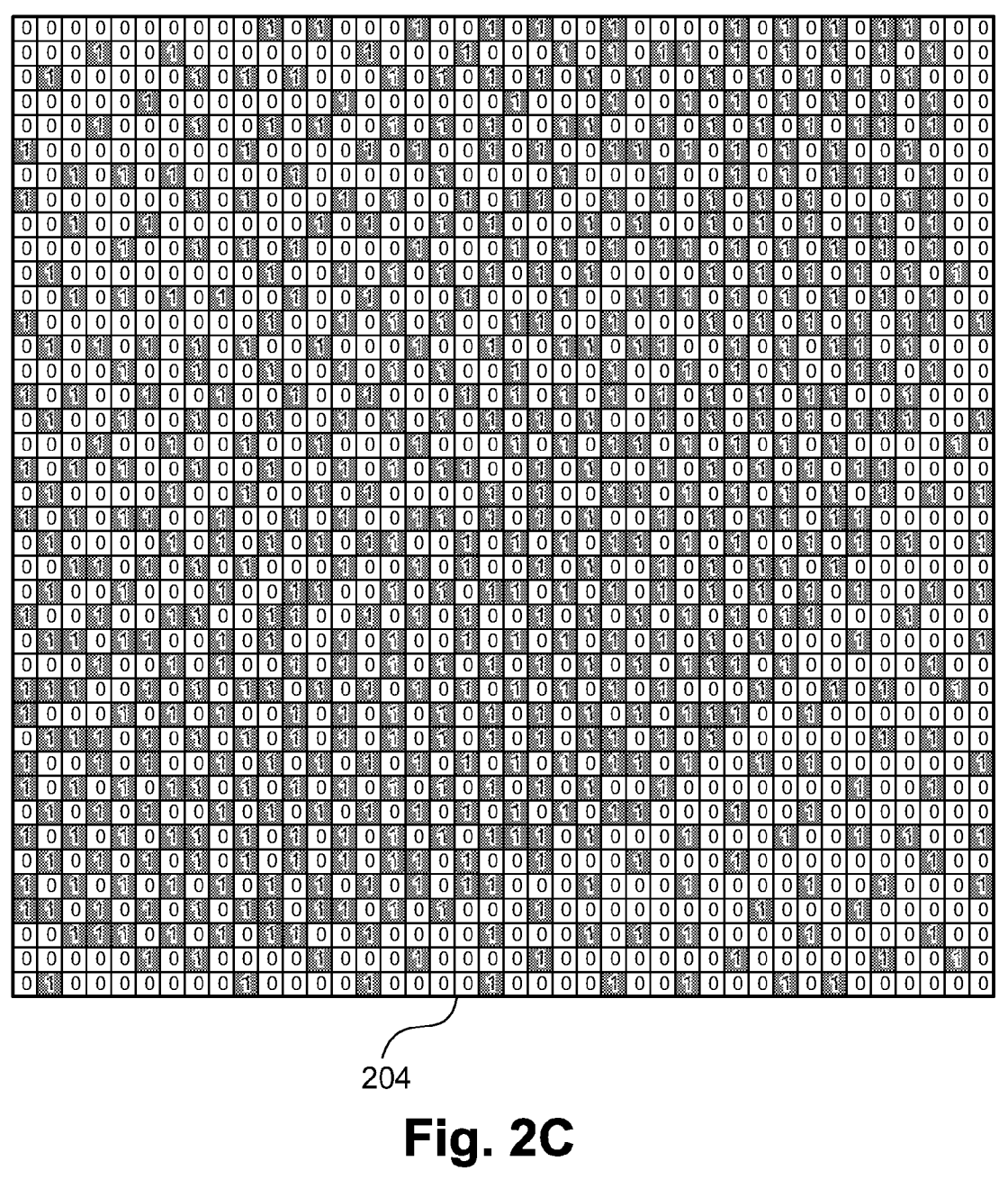

A further requirement of having accurate attribute information (e.g., in the form of attribute values) is shown by area 204 in FIG. 2C, where the area 204 is a magnified view of the highlighted region 202 shown in FIG. 2A. In contrast to the region 201, all of the pixels in region 202 (i.e., as represented by area 204) are marked with an attribute value as having the attribute-type "image" and are therefore typically correctly identified in conventional rendering systems. Correctly marking pixels as "image" pixels in the region 202 of natural image data allows a conventional post-processing system to process the pixel data in these regions using methods suited for image data, but unsuited for other object types such as text or linework. For example, smoothing image data often improves appearance of the natural image data as represented by the area 204, while smoothing text or linework often degrades appearance of text or linework.

The described methods are configured to ensure that all pixels in an area such as the area 206 are marked with an "image" attribute value. The described methods ensure that all pixels in the area 206 are marked with the image attribute value due to the fact that the region 206 in a JBIG2 image is typically encoded using different algorithms compared to the algorithms used to encode text, such as in the region 201.

The differing effects shown in the images 203 and 205, for what is otherwise on a purely pixel by pixel basis indistinguishable data, are achieved by the use of an attribute map as described below. An attribute map provides additional information about each pixel in an image. Such an attribute map needs to be accurate. However, using conventional methods when rendering PDF document pages that contain scanned documents and similar types of images, conventional systems are not able to generate an accurate attribute map.

Figure 1C:
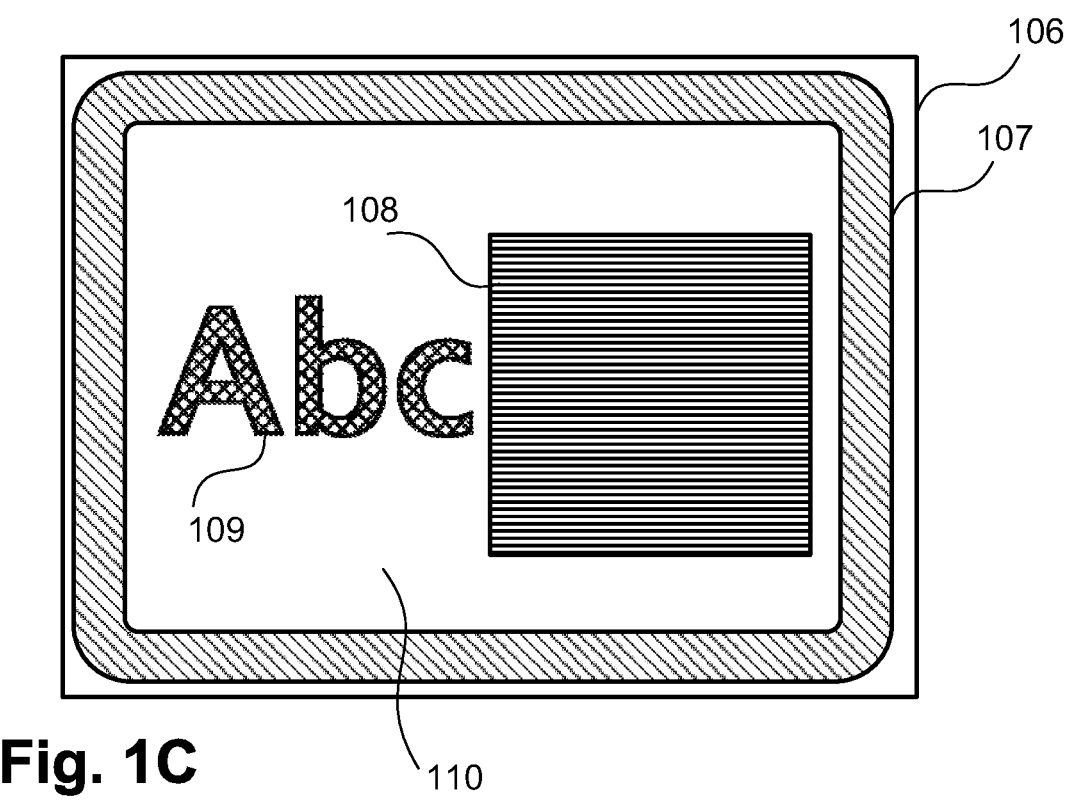
FIG. 1C shows an attribute bitmap generated when rendering a page in a PDF document containing the full page image shown in FIG. 1A.

The described methods generate an attribute map, such as attribute map 106 shown in FIG. 1C, for images (e.g., the image 101) with mixed content, even though the mixed content image 101 is itself a single image. The attribute map 106 shows an area 107 of pixels each having associated "graphic" attribute values corresponding to the image 102, an area 108 of pixels each having associated "image" attribute values, corresponding to the natural image content 103 and a number of pixels 109 each having associated "text" attribute values corresponding to the text 104. Accordingly, each of the pixels of the area 107 are marked with an attribute value "graphic", each of the pixels of the area 108 are marked with an attribute value "image" and each of the pixels of the area 109 are marked with an attribute value "text". In the example of FIG. 1C, the attribute value is therefore at least one of "text", "graphics" and "image". The attribute value associated with pixels in the attribute map 106 can also be "none" for areas of the attribute map 106, such as the area 110, representing corresponding areas of the image 101 which are blank.

As described above, it is not practical to determine per-pixel based type information using image analysis methods at rendering time. In the case of JBIG2 compressed images, a typical JBIG2 encoder will have performed such an analysis of the bi-level bitmap during the operation of creating the compressed image. Some of the per-pixel based type information of an image can be reconstructed from a corresponding JBIG2 file structure and the coding procedures chosen to encode the image as the coding procedures are chosen based on the content of the image. Therefore, by analysing the structure of a JBIG2 file and the coding procedures used while adding an intentionally minimal amount of processing during the JBIG2 image decompression process, it is possible to construct a useable and in most cases accurate attribute map without being processor intensive.

As described in detail below, in one arrangement, a value is associated with a pixel in the attribute map by locating a corresponding pixel in a sub-bitmap and using a value of the corresponding pixel as the value associated with the pixel in the attribute map, the corresponding pixel being determined using a position of the sub-bitmap relative to the JBIG2 compressed image, the position of the sub-bitmap being determined based on the position of a corresponding segment in the JBIG2 compressed image.

Figure 3:
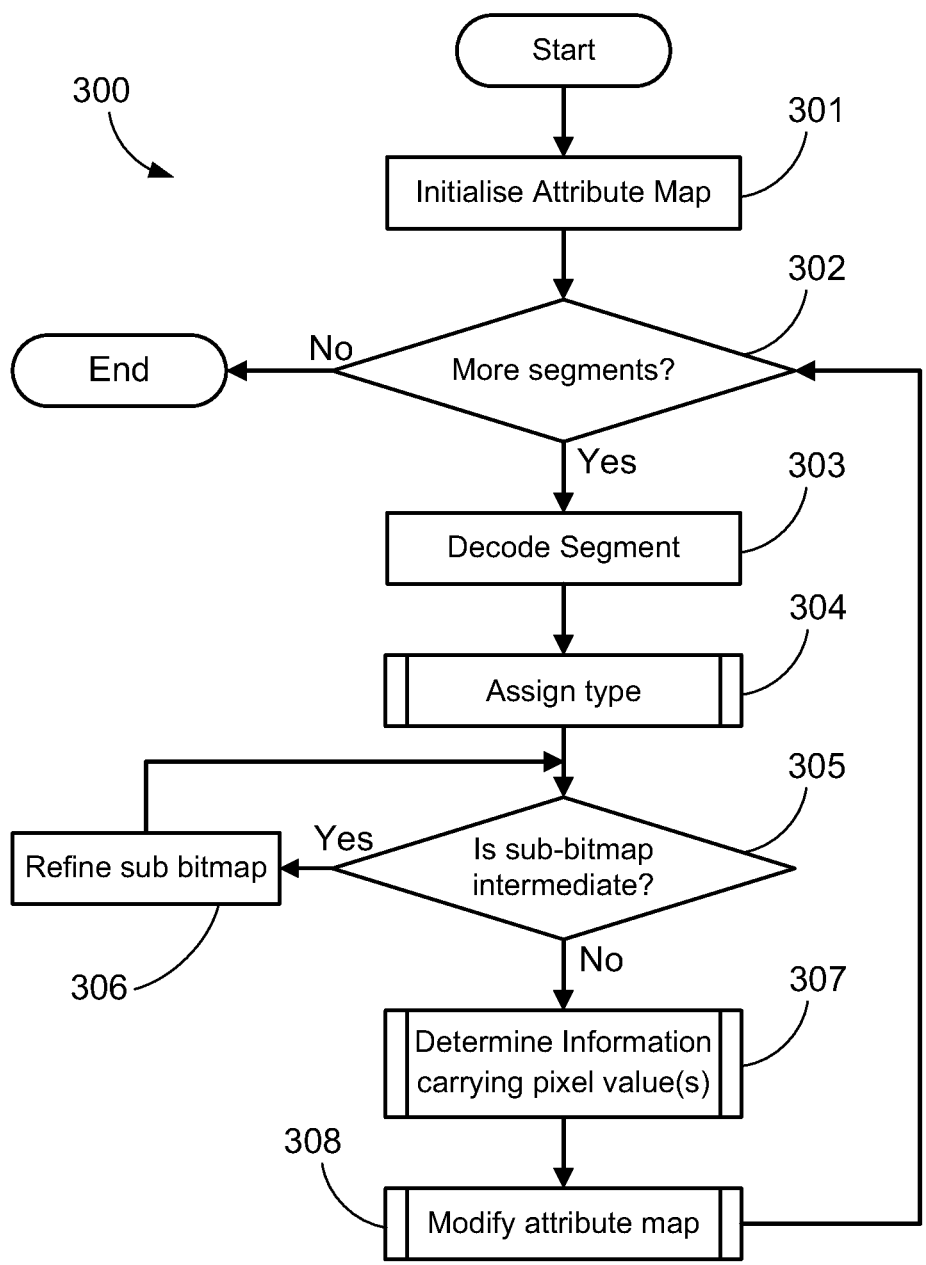
FIG. 3 is a flow diagram showing a method of generating an attribute map for processing a JBIG2 compressed image.

FIG. 3 shows a method 300 of generating an attribute map for processing an image compressed using JBIG2 ("JBIG2 compressed image"). The method 300, and other methods described below, may be implemented as one or more software code modules of a software application program 1033 resident within memory 1006 and being controlled in its execution by processor 1005 of a general-purpose computer system 1000 as shown in FIGS. 10A and 10B.

Figure 10A:
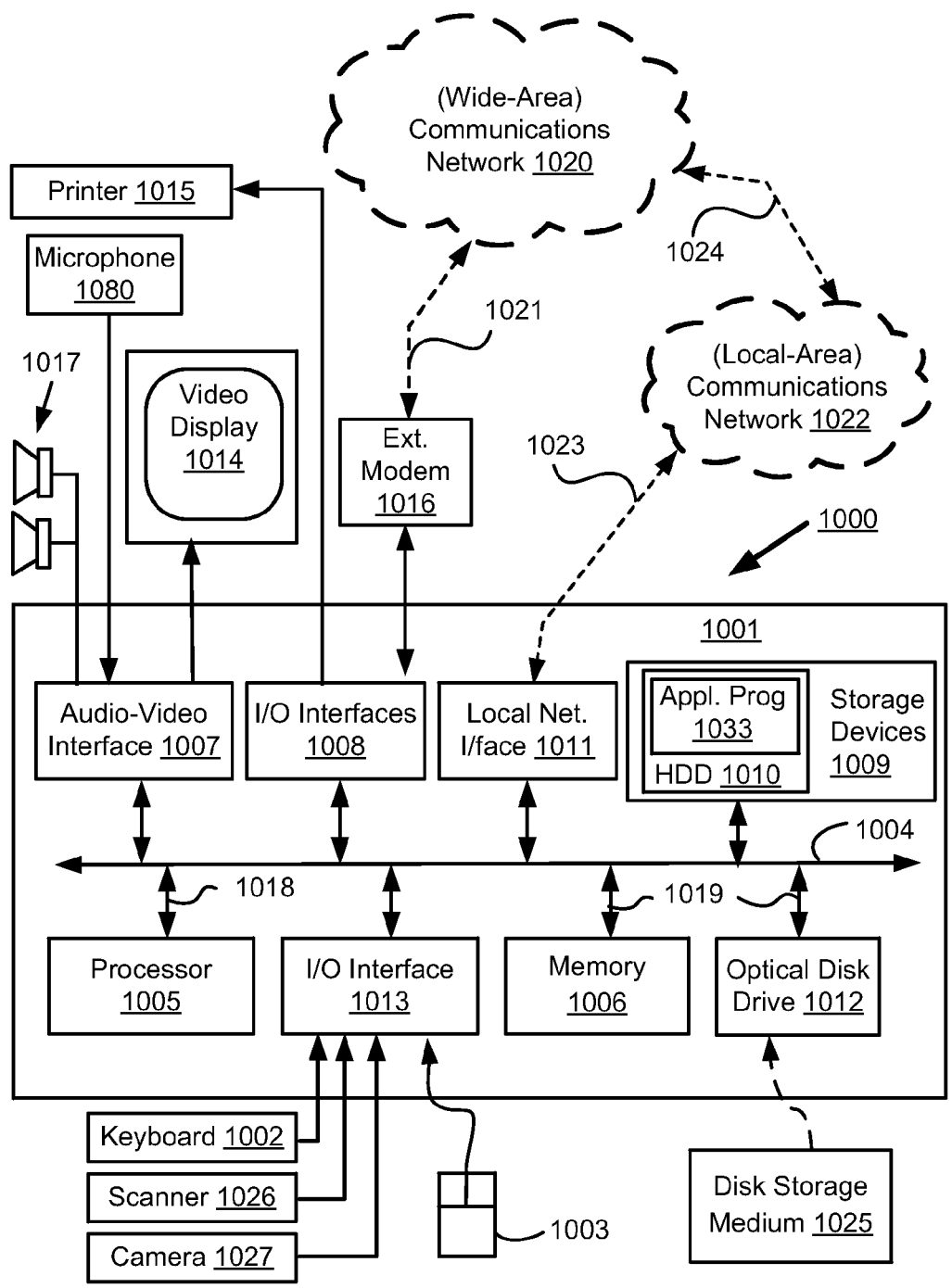
FIGS. 10A and 10B form a schematic block diagram of a general purpose computer system upon which arrangements described can be practiced.
Figure 10B:
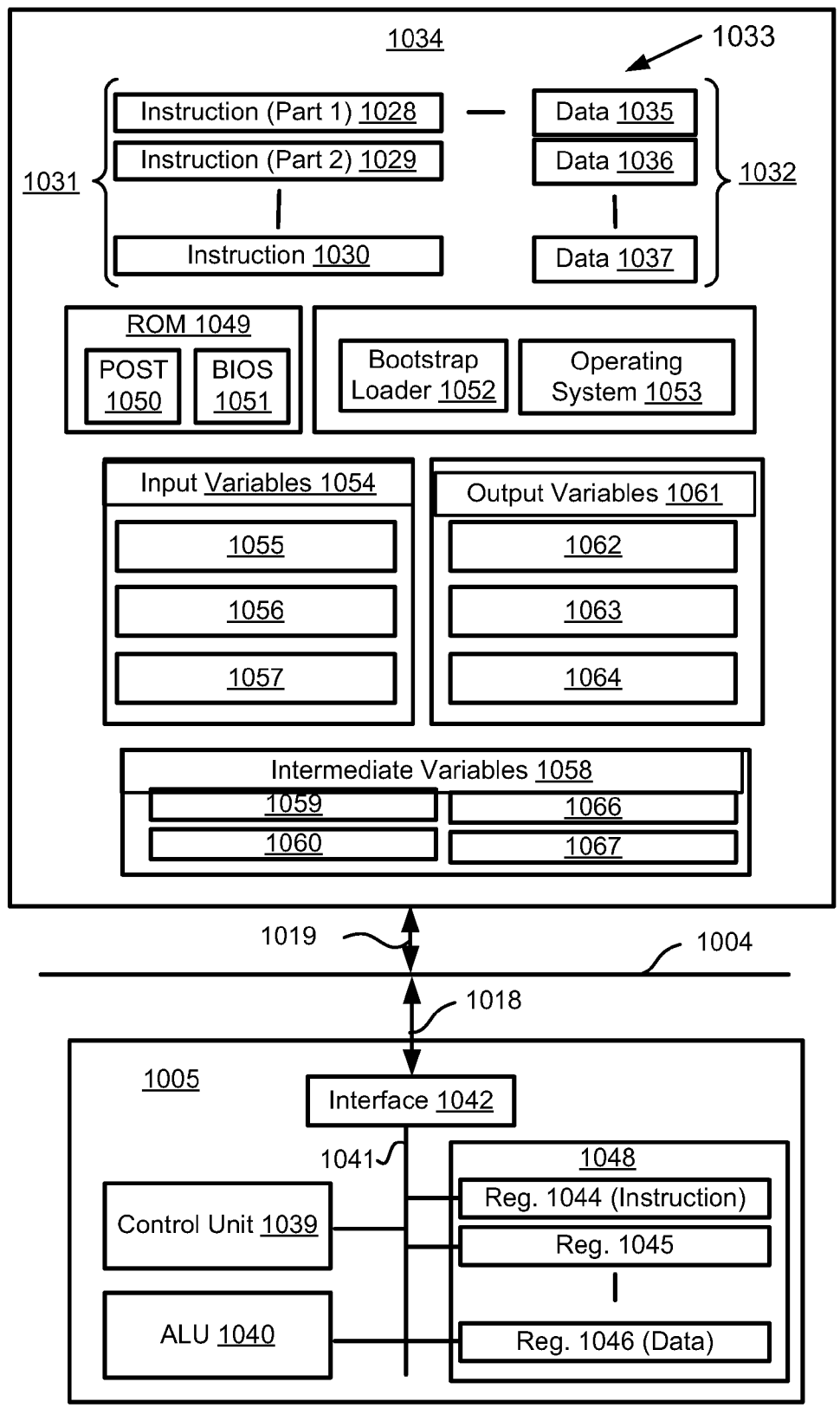

As seen in FIG. 10A, the computer system 1000 includes: a computer module 1001; input devices such as a keyboard 1002, a mouse pointer device 1003, a scanner 1026, a camera 1027, and a microphone 1080; and output devices including a printer 1015, a display device 1014 and loudspeakers 1017. An external Modulator-Demodulator (Modem) transceiver device 1016 may be used by the computer module 1001 for communicating to and from a communications network 1020 via a connection 1021. The communications network 1020 may be a wide-area network (WAN), such as the Internet, a cellular telecommunications network, or a private WAN. Where the connection 1021 is a telephone line, the modem 1016 may be a traditional "dial-up" modem. Alternatively, where the connection 1021 is a high capacity (e.g., cable) connection, the modem 1016 may be a broadband modem. A wireless modem may also be used for wireless connection to the communications network 1020.

The computer module 1001 typically includes at least one processor unit 1005, and a memory unit 1006. For example, the memory unit 1006 may have semiconductor random access memory (RAM) and semiconductor read only memory (ROM). The computer module 1001 also includes an number of input/output (I/O) interfaces including: an audio-video interface 1007 that couples to the video display 1014, loudspeakers 1017 and microphone 1080; an I/O interface 1013 that couples to the keyboard 1002, mouse 1003, scanner 1026, camera 1027 and optionally a joystick or other human interface device (not illustrated); and an interface 1008 for the external modem 1016 and printer 1015. In some implementations, the modem 1016 may be incorporated within the computer module 1001, for example within the interface 1008. The computer module 1001 also has a local network interface 1011, which permits coupling of the computer system 1000 via a connection 1023 to a local-area communications network 1022, known as a Local Area Network (LAN). As illustrated in FIG. 10A, the local communications network 1022 may also couple to the wide network 1020 via a connection 1024, which would typically include a so-called "firewall" device or device of similar functionality. The local network interface 1011 may comprise an Ethernet circuit card, a Bluetooth® wireless arrangement or an IEEE 802.11 wireless arrangement; however, numerous other types of interfaces may be practiced for the interface 1011.

The I/O interfaces 1008 and 1010 may afford either or both of serial and parallel connectivity, the former typically being implemented according to the Universal Serial Bus (USB) standards and having corresponding USB connectors (not illustrated). Storage devices 1009 are provided and typically include a hard disk drive (HDD) 1010. Other storage devices such as a floppy disk drive and a magnetic tape drive (not illustrated) may also be used. An optical disk drive 1012 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1000.

The components 1005 to 1013 of the computer module 1001 typically communicate via an interconnected bus 1004 and in a manner that results in a conventional mode of operation of the computer system 1000 known to those in the relevant art. For example, the processor 1005 is coupled to the system bus 1004 using a connection 1018. Likewise, the memory 1006 and optical disk drive 1012 are coupled to the system bus 1004 by connections 1019. Examples of computers on which the described arrangements can be practised include IBM-PC's and compatibles, Sun Sparcstations, Apple Mac or a like computer systems.

The described methods may be implemented using the computer system 1000 wherein the processes of FIGS. 3 to 7, to be described, may be implemented as one or more software application programs 1033 executable within the computer system 1000. In particular, the steps of the described methods are effected by instructions 1031 (see FIG. 10B) in the software 1033 that are carried out within the computer system 1000. The software instructions 1031 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 1033 is typically stored in the HDD 1010 or the memory 1006. The software is loaded into the computer system 1000 from the computer readable medium, and then executed by the computer system 1000. Thus, for example, the software 1033 may be stored on an optically readable disk storage medium (e.g., CD-ROM) 1025 that is read by the optical disk drive 1012. A computer readable medium having such software or computer program recorded on the computer readable medium is a computer program product. The use of the computer program product in the computer system 1000 preferably effects an advantageous apparatus for implementing the described methods.

In some instances, the application programs 1033 may be supplied to the user encoded on one or more CD-ROMs 1025 and read via the corresponding drive 1012, or alternatively may be read by the user from the networks 1020 or 1022. Still further, the software can also be loaded into the computer system 1000 from other computer readable media. Computer readable storage media refers to any non-transitory tangible storage medium that provides recorded instructions and/or data to the computer system 1000 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 1001. Examples of transitory or non-tangible computer readable transmission media that may also participate in the provision of software, application programs, instructions and/or data to the computer module 1001 include radio or infra-red transmission channels as well as a network connection to another computer or networked device, and the Internet or Intranets including e-mail transmissions and information recorded on Websites and the like.

The second part of the application programs 1033 and the corresponding code modules mentioned above may be executed to implement one or more graphical user interfaces (GUIs) to be rendered or otherwise represented upon the display 1014. Through manipulation of typically the keyboard 1002 and the mouse 1003, a user of the computer system 1000 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1017 and user voice commands input via the microphone 1080.

FIG. 10B is a detailed schematic block diagram of the processor 1005 and a "memory" 1034. The memory 1034 represents a logical aggregation of all the memory modules (including the HDD 1009 and semiconductor memory 1006) that can be accessed by the computer module 1001 in FIG. 10A.

When the computer module 1001 is initially powered up, a power-on self-test (POST) program 1050 executes. The POST program 1050 is typically stored in a ROM 1049 of the semiconductor memory 1006 of FIG. 10A. A hardware device such as the ROM 1049 storing software is sometimes referred to as firmware. The POST program 1050 examines hardware within the computer module 1001 to ensure proper functioning and typically checks the processor 1005, the memory 1034 (1009, 1006), and a basic input-output systems software (BIOS) module 1051, also typically stored in the ROM 1049, for correct operation. Once the POST program 1050 has run successfully, the BIOS 1051 activates the hard disk drive 1010 of FIG. 10A. Activation of the hard disk drive 1010 causes a bootstrap loader program 1052 that is resident on the hard disk drive 1010 to execute via the processor 1005. This loads an operating system 1053 into the RAM memory 1006, upon which the operating system 1053 commences operation. The operating system 1053 is a system level application, executable by the processor 1005, to fulfil various high level functions, including processor management, memory management, device management, storage management, software application interface, and generic user interface.

The operating system 1053 manages the memory 1034 (1009, 1006) to ensure that each process or application running on the computer module 1001 has sufficient memory in which to execute without colliding with memory allocated to another process. Furthermore, the different types of memory available in the system 1000 of FIG. 10A must be used properly so that each process can run effectively. Accordingly, the aggregated memory 1034 is not intended to illustrate how particular segments of memory are allocated (unless otherwise stated), but rather to provide a general view of the memory accessible by the computer system 1000 and how such is used.

As shown in FIG. 10B, the processor 1005 includes a number of functional modules including a control unit 1039, an arithmetic logic unit (ALU) 1040, and a local or internal memory 1048, sometimes called a cache memory. The cache memory 1048 typically include a number of storage registers 1044-1046 in a register section. One or more internal busses 1041 functionally interconnect these functional modules. The processor 1005 typically also has one or more interfaces 1042 for communicating with external devices via the system bus 1004, using a connection 1018. The memory 1034 is coupled to the bus 1004 using a connection 1019.

The application program 1033 includes a sequence of instructions 1031 that may include conditional branch and loop instructions. The program 1033 may also include data 1032 which is used in execution of the program 1033. The instructions 1031 and the data 1032 are stored in memory locations 1028, 1029, 1030 and 1035, 1036, 1037, respectively. Depending upon the relative size of the instructions 1031 and the memory locations 1028-1030, a particular instruction may be stored in a single memory location as depicted by the instruction shown in the memory location 1030. Alternately, an instruction may be segmented into a number of parts each of which is stored in a separate memory location, as depicted by the instruction segments shown in the memory locations 1028 and 1029.

In general, the processor 1005 is given a set of instructions which are executed therein. The processor 1105 waits for a subsequent input, to which the processor 1005 reacts to by executing another set of instructions. Each input may be provided from one or more of a number of sources, including data generated by one or more of the input devices 1002, 1003, data received from an external source across one of the networks 1020, 1002, data retrieved from one of the storage devices 1006, 1009 or data retrieved from a storage medium 1025 inserted into the corresponding reader 1012, all depicted in FIG. 10A. The execution of a set of the instructions may in some cases result in output of data. Execution may also involve storing data or variables to the memory 1034.

The disclosed arrangements use input variables 1054, which are stored in the memory 1034 in corresponding memory locations 1055, 1056, 1057. The arrangements produce output variables 1061, which are stored in the memory 1034 in corresponding memory locations 1062, 1063, 1064. Intermediate variables 1058 may be stored in memory locations 1059, 1060, 1066 and 1067.

Referring to the processor 1005 of FIG. 10B, the registers 1044, 1045, 1046, the arithmetic logic unit (ALU) 1040, and the control unit 1039 work together to perform sequences of micro-operations needed to perform "fetch, decode, and execute" cycles for every instruction in the instruction set making up the program 1033. Each fetch, decode, and execute cycle comprises:

a fetch operation, which fetches or reads an instruction 1031 from a memory location 1028, 1029, 1030;

a decode operation in which the control unit 1039 determines which instruction has been fetched; and an execute operation in which the control unit 1039 and/or the ALU 1040 execute the instruction.

Thereafter, a further fetch, decode, and execute cycle for the next instruction may be executed. Similarly, a store cycle may be performed by which the control unit 1039 stores or writes a value to a memory location 1032.

Each step or sub-process in the processes of FIGS. 1 to 12B is associated with one or more segments of the program 1033 and is performed by the register section 1044, 1045, 1047, the ALU 1040, and the control unit 1039 in the processor 1005 working together to perform the fetch, decode, and execute cycles for every instruction in the instruction set for the noted segments of the program 1033.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

The method 300 described with reference to the flow diagram of FIG. 3 is performed in addition to the normal steps taken to decode the JBIG2 compressed image. In some arrangements, the method 300 may be executed during the JBIG2 decoding process used to decode the JBIG2 compressed image. For example, the method 300 may be executed in parallel to the JBIG2 decoding process used in decoding the JBIG2 compressed image. Alternatively, the method 300 may be executed as a sub-step of the JBIG2 decoding process used in decoding the JBIG2 compressed image.

Prior to or during execution of the method 300, the processor 1005 is used for receiving a JBIG2 file containing the JBIG2 compressed image encoded into a plurality of image segments (or "segments"), each segment being characterised by a position within a base region as described below, the base region being associated with the JBIG2 compressed image and being encoded according to the corresponding JBIG2 encoding format. In accordance with the described methods, the image segments are combined with the base region to produce a decoded image, each segment being associated with a combination operation determining a process of combining the segments with the underlying base region, each segment being characterised by an attribute value derived based on a format used to produce the segment. The JBIG2 file containing the compressed JBIG2 image may be stored within the memory 1006.

The method 300 begins at initialisation step 301, where the processor 1005 is used to allocate a portion of the memory 1006 for an attribute map (or attribute bitmap) which has the same dimensions (in pixels) as a JBIG2 cumulative bitmap associated with the JBIG2 compressed image. The JBIG2 cumulative bitmap forms the base region associated with the JBIG2 compressed image (i.e., the image compressed using JBIG2) being decoded. A region formed by the attribute map corresponds to the base region overlapped by a sub-bitmap according to an associated position and size as described below.

Also at step 301, the attribute-bitmap is initialised by setting all pixels contained therein to an empty default attribute value. In one arrangement, the attribute map may be initialised by setting each pixel attribute value of the attribute map to zero (0). In some cases, the complete attribute map may be initialised to an attribute value "image", with the result that all pixels in the JBIG2 compressed image will have the "image" attribute, except for those pixels determined to be either text or graphics.

The JBIG2 compressed image may in some cases be striped, in which case the cumulative image is divided into abutting horizontal bands which are decoded in order, starting at the top.

The method 300 may be adapted for striped JBIG2 compressed images by also striping the attribute map stored in the memory 1006 and by initialising a new stripe for the attribute map every time a new stripe in the cumulative bitmap is initialised. As previously described, in the case that the JBIG2 compressed image is striped, there is a cumulative bitmap for each stripe and likewise the attribute map itself is then also striped. Therefore each cumulative bitmap stripe has a corresponding attribute map stripe. After decoding is complete, the cumulative bitmap stripes and the attribute bitmap stripes respectively are joined together to form a complete JBIG2 decoded image with corresponding attribute map.

For striped JBIG2 compressed images, step 301 may be moved to be within the main loop (i.e., below the "Yes" decision of 302) of the method 300 and a new stripe may be initialised for both the cumulative bitmap and the attribute map the first time after encountering a page information segment and thereafter for every end of stripe segment processed. The dimensions used for the stripe are specified in the page information segment which specifies the width and a height of maximum stripe size. The height of the stripe (both attribute map and cumulative bitmap) may be reduced when the corresponding end stripe segment is received as the end of stripe segment type not only indicates the end of decoding for the current stripe but also specifies the actual height of the stripe. While the stripes may all end up having different heights, the stripes are always abutting and combined to form the JBIG2 decoded image.

The method 300 then proceeds to decision step 302, in which the processor 1005 is used to determine if there remain any JBIG2 image segments of the JBIG2 compressed image yet to be processed. If there are no more JBIG2 image segments remaining, then the method 300 ends. Basing the decision step 302 to end on the presence of more segments instead of the end file or end of page segment is done as there is no end of file or end of page (cumulative bitmap) indication for JBIG2 when embedded within PDF. Otherwise, the method 300 proceeds to decoding step 303, where the processor 1005 is used for decoding a next segment of the plurality of segments of the JBIG2 compressed image to produce a sub-bitmap. The sub-bitmap may also be referred to as a "sub-image". As described below, the sub-bitmap is associated with a combination operator and an attribute value derived based on at least one of a segment decoding format and a segment encoding format, the combination operator determining a process of combining the sub-bitmap with the underlying base region formed by the cumulative bitmap.

In accordance with the method 300, segments containing meta-data or dictionaries are completely disregarded as the segments do not influence the attribute map creation. The only segment types that influence the attribute map creation are "region" type segments, including refinement regions, the type being identified by a segment header. At decoding step 303 the current segment is decoded as specified by ISO/IEC 14492:2001 into the sub-bitmap using any suitable region decoding procedure. The sub-bitmap may be stored within the memory 1006.

The method 300 then proceeds to assigning step 304, at which a type flag is assigned to the sub-bitmap produced at decoding step 303. The assigned type flag is based on the decoding procedure used by JBIG2 in step 303. For example, a sub-bitmap decoded for an immediate text region segment (segment type number equal to 6) is assigned the attribute value "text". In JBIG2, the segment type identifies the decoding procedure that needs to be used for decoding which is a reverse of the encoding procedure used by an encoder. Therefore, in one arrangement, the type flag can be interchangeably assigned based on both the encoding and decoding procedure. A method 400 of assigning a type to a sub-bitmap based on a compression method used to encode the sub-bitmap at the assigning step 304 will be described below with reference to FIG. 4.

The method 300 then proceeds to decision step 305, at which the processor 1005 is used to determine whether the sub-bitmap for the current segment is intermediate. Intermediate segments are segments that are not directly combined with the cumulative bitmap, but initially kept separate and are modified in isolation, potentially even multiple times. If the segment is intermediate the method 300 then proceeds to refinement step 306, which the segment will be further refined as specified by ISO/IEC 14492:2001. The refinement procedure will typically only make small changes to the sub-bitmap resulting from the intermediate segment, therefore the type that was assigned to the sub-bitmap at step 304 remains valid. The order of the steps of the method 300 described in relation to FIG. 3 is conceptual only, the process of refining the segment as executed at step 306 is itself initiated by a segment which does not necessarily occur in sequentially following segments. According to the JBIG2 compression format the refined sub-bitmap replaces the sub-bitmap being refined and at some point the refined sub-bitmap is no longer intermediate, at which point the refined sub-bitmap is combined with the cumulative bitmap.

At decision step 305, if the sub-bitmap is not intermediate, then the method 300 proceeds to determining step 307 at which the processor 1005 is used in determining an information carrying pixel value in the sub-bitmap based on the sub-bitmap pixel content and the attribute value associated with the sub-bitmap. In particular, the processor 1005 is used to determine whether the sub-bitmap is to be considered as white content (white foreground) on a black background, or black content (black foreground) on a white background. Determining the foreground for the sub-bitmap allows attribute information, in the form of pixel attribute values, to be more accurately set so that the specific pixels corresponding to a character of text, for example, may be marked with the attribute value "text". Determining the foreground for the sub-bitmap also allows the edges of characters to be determined. The determination of the information carrying pixel at step 307 is light weight as the processing is occurring at render time and needs to be fast. A method 500 of determining an information carrying pixel value in a sub-bitmap, as executed at step 307, will be described later with reference to FIG. 5.

For the case of Amendment 3 of the JBIG2 compression format, which introduces colour to the JBIG2 compression format, the concept of foreground and background is pre-defined, as the background is considered to be transparent. Where the JBIG2 compressed image is compressed in accordance with Amendment 3, there is no need to determine foreground versus background pixels based on a statistical distribution of image content at step 307, any pixel that is transparent after decoding is background, while any pixel of colour is foreground. The attribute value is then associated with all foreground pixels (pixels that are not background) of the sub-bitmap.

After determining the information carrying pixel value within the sub-bitmap, the method 300 proceeds to modifying step 308, in which the attribute map is modified under execution of the processor 1005 to generate the attribute map for processing the JBIG2 compressed image, the attribute map being generated using the attribute value associated with the sub-bitmap for at least one target pixel of the attribute map. The attribute value is also associated with one segment for at least one element of the attribute map. As described below, in generating the attribute map, depending on the combining operation specified for the sub-bitmap, at least an existing attribute value of the attribute map may be retained for the target pixel in the attribute map corresponding to the non-information carrying pixel in the sub-bitmap. The described methods are used for discarding or retaining the attribute value for the target pixel of the attribute map. The determination of whether to discard or retain an attribute value associated with the target pixel is based on a combination operation and whether a corresponding sub-bitmap pixel value is information carrying.

Figure 6:
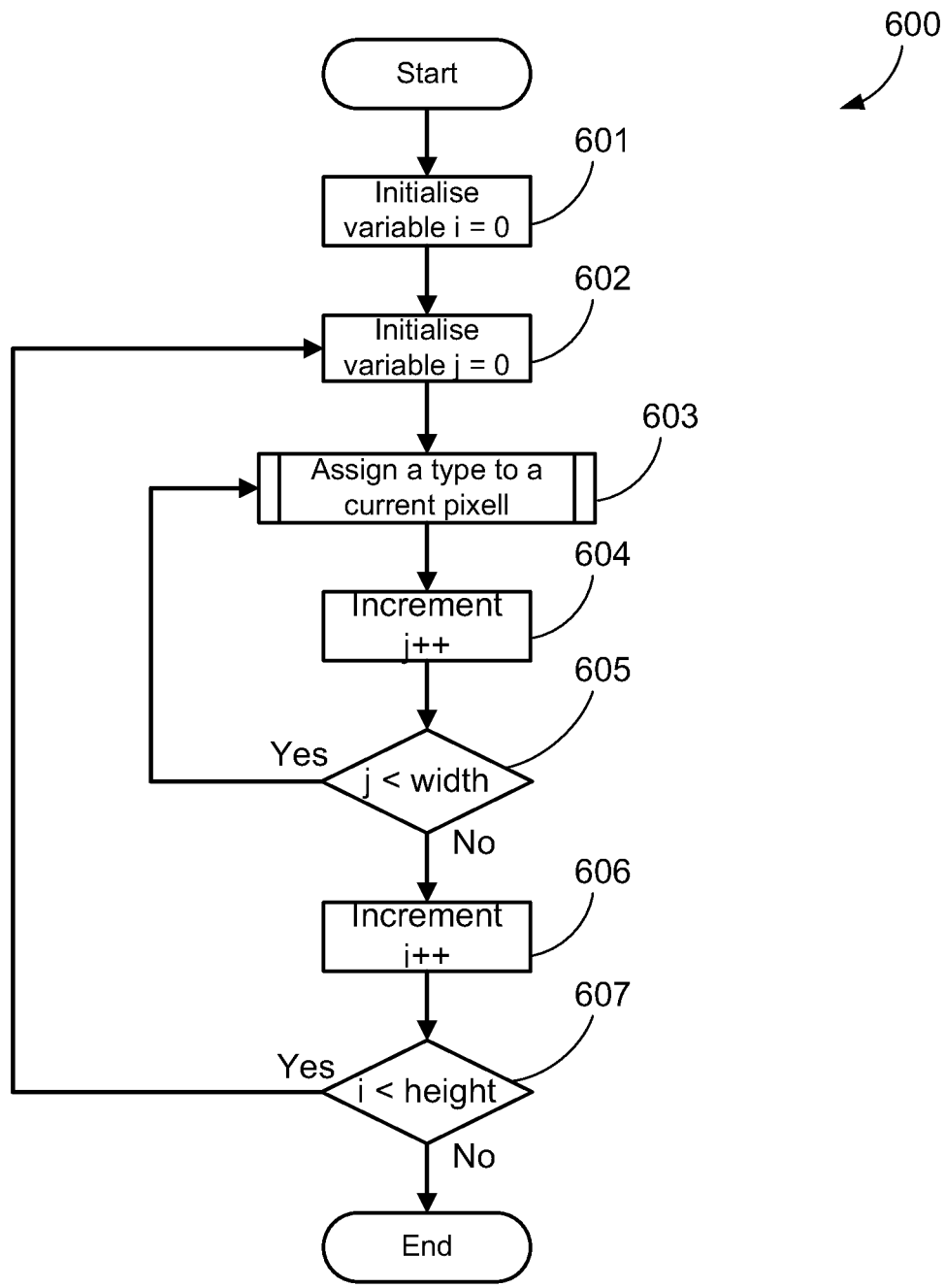
FIG. 6 is a flow diagram showing a method of modifying each pixel in an attribute map corresponding to a pixel in a sub-bitmap.
Figure 7:
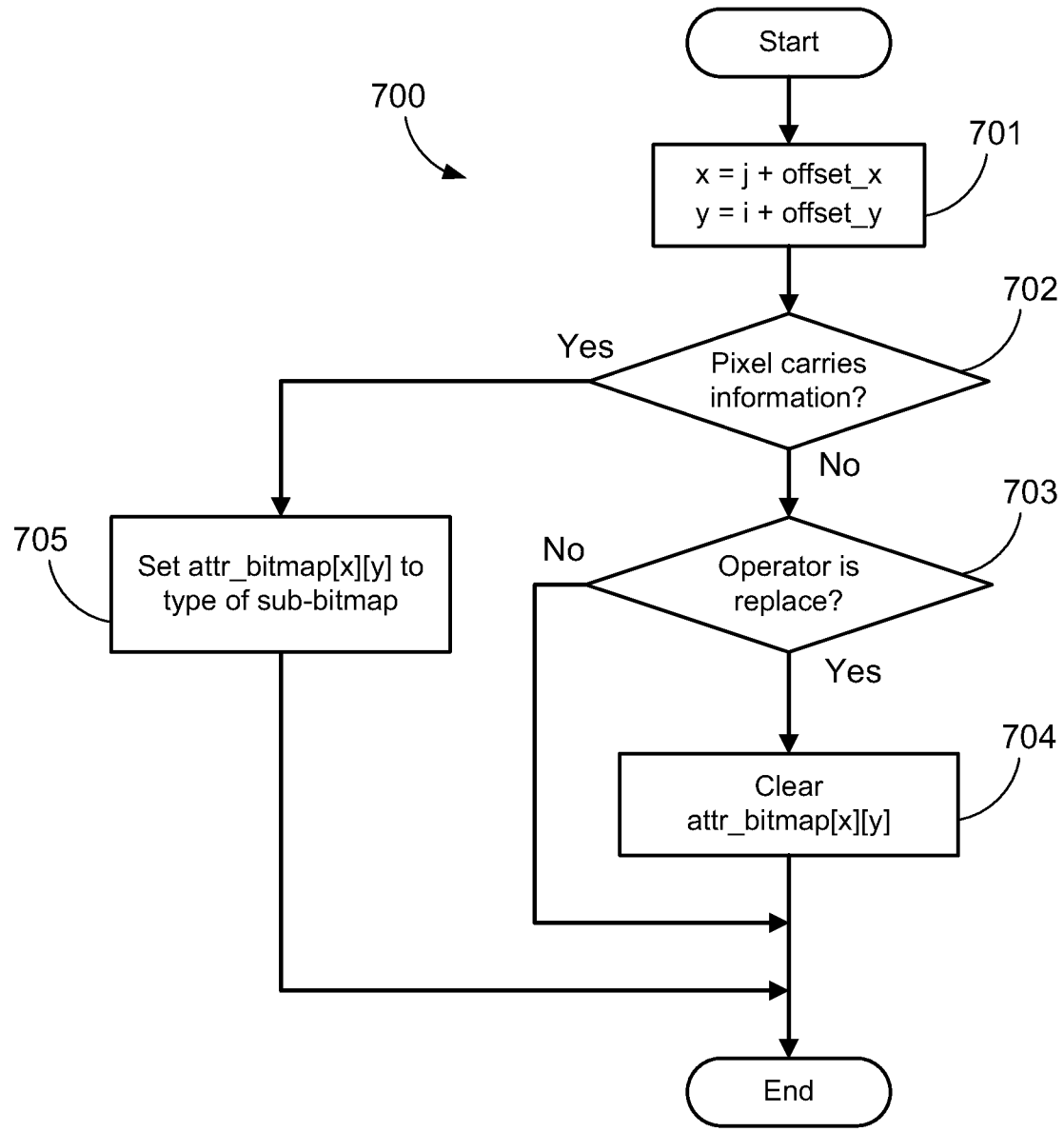
FIG. 7 is a flow diagram showing a method of assigning a type to a pixel within an attribute map.

A method 600 of modifying each pixel in an attribute map corresponding to a pixel in a sub-bitmap, as executed at modifying step 308, will be described below with reference to FIGS. 6 and 7. The method 600 is used for determining, in the attribute map, a target element associated with (or "corresponding to") a pixel in the sub-bitmap having a value which is distinct from an information carrying pixel value of the sub-bitmap.

After modifying step 308, the method 300 returns to step 302.

The determined attribute value is associated either with all the black pixels or all the white pixels, or with both all black and white pixels in the sub-bitmap, depending on the result of step 307. A single flag associated with a sub-bitmap is therefore sufficient to determine the attribute value associated with every pixel in the sub-bitmap once the information carrying pixel value is known. The modification of the attribute map at step 308, to generate the attribute map for processing the image is performed using the attribute value of every pixel in the sub-bitmap and the relative position of each pixel within the sub-bitmap as specified with regard to the cumulative bitmap.

Figure 4:
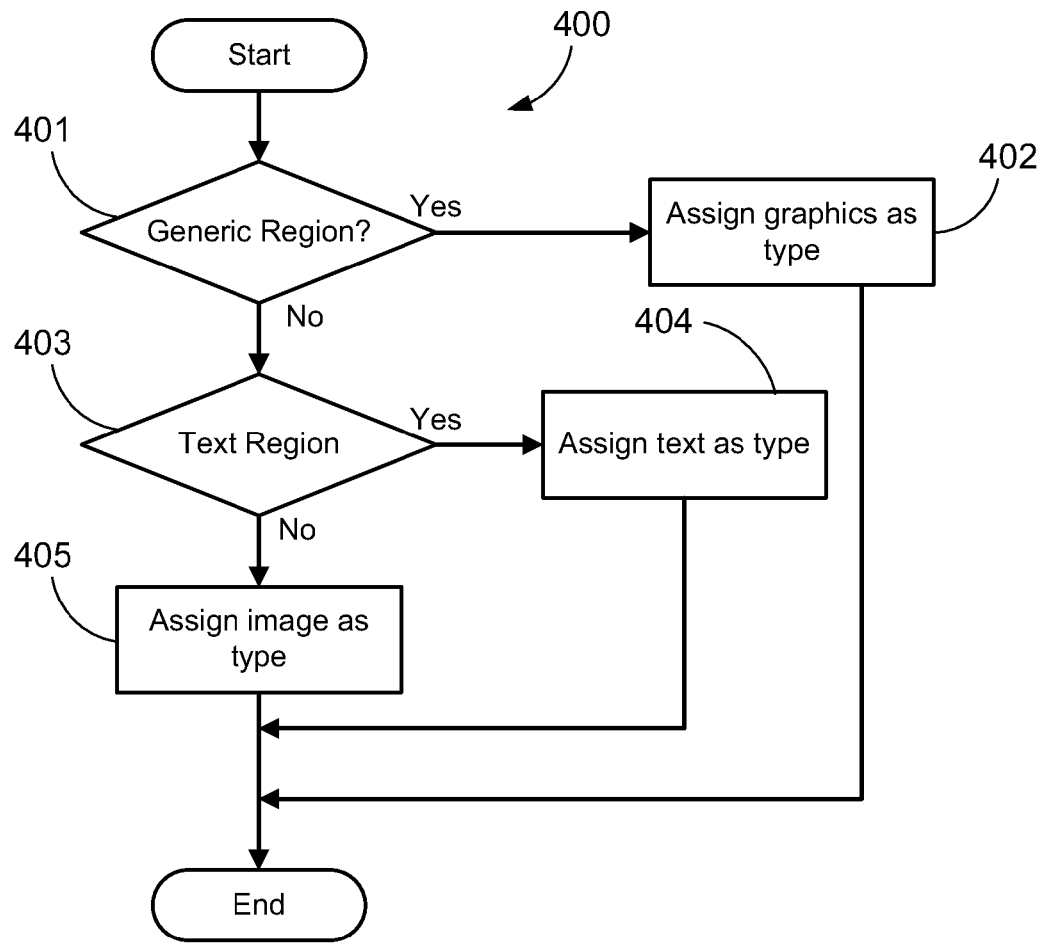
FIG. 4 is a flow diagram showing a method of assigning a type to a sub-bitmap based on a compression method used to encode the sub-bitmap.

The method 400 of assigning an attribute type to a sub-bitmap based on a compression method used to encode the sub-bitmap at the assigning step 304 invoked at assigning step 304 will be described below with reference to FIG. 4. The method 400 may be implemented as one or more software code modules of the software application program 1033 resident in the hard disk drive and being controlled in its execution by the processor 1005.

The method 400 begins at decision step 401, at which the processor 1005 is used to determine if the sub-bitmap is a "generic region". A generic Region in JBIG2 specifies a certain decoding procedure.

If the sub-bitmap is a generic region, then the method 400 proceeds to assigning step 402. At step 402, the processor 1005 is used to assign type graphics, where the step of assigning executed at step 402 may be implemented by adding a type field to a header structure of the sub-bitmap, and the method 400 ends. Otherwise, the method 400 proceeds to decision step 403, at which the processor 1005 is used to determine if the sub-bitmap is a text region.

If the sub-bitmap is a text region, then the method 400 proceeds to assigning step 404, at which the sub-bitmap is assigned type text, and the method 400 concludes. Otherwise, the method 405 proceeds to assigning step 405 at which the sub-bitmap is assigned type "image", and the method 400 ends.

Figure 5:
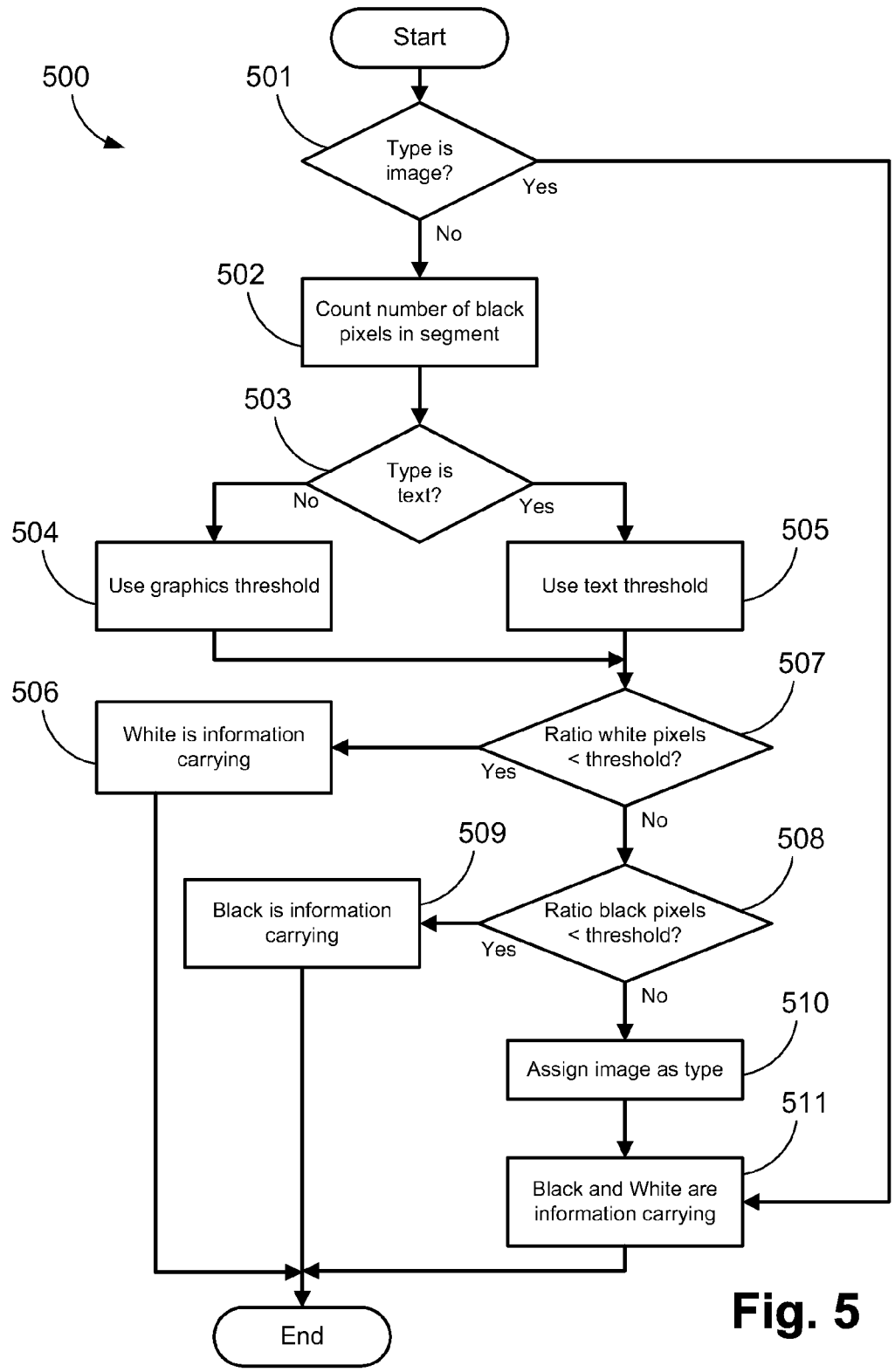
FIG. 5 is a flow diagram showing a method of determining information carrying pixel value in a sub-bitmap.

The method 500 of determining an information-carrying pixel value for a sub-bitmap, as executed at determining step 307, will now be described with reference to FIG. 5. The method 500 may be implemented as one or more software code modules of the software application program 1033 resident in the hard disk drive 1010 and being controlled in its execution by the processor 1005.

In accordance with the described method 500, a pixel is information carrying based on a number of pixels having a particular pixel value (for example, black or white) within a sub-bitmap relative to a number of all pixels within the sub-bitmap, if the attribute value associated with the sub-bitmap is "text" or "graphics".

The method 500 begins at decision step 501, where the processor 1005 is used to determine if the type of the sub-bitmap is "image". If the type of the sub-bitmap is "image", then the method 500 proceeds to marking step 511. At step 511, both black and white pixels are set by the processor 1005 as information carrying, effectively marking the complete sub-bitmap as information carrying. All pixels of the sub-bitmap are information carrying if the attribute value associated with the sub-bitmap is "image". The method 500 concludes following step 511.

If the sub-bitmap is not of type "image", then the method 500 proceeds to counting step 502 at which the number of black pixels in the sub-bitmap is counted. In one arrangement, the number of black pixels in the sub-bitmap may be counted using a small lookup table that specifies the amount of set bits (black pixels) in a word. Eight (8) pixels (assuming a 8-bit-word represents 8 pixels, and lines in the sub-bitmap are padded to a multiple of 8) are processed simultaneously. By using a lookup table, it is unnecessary to count the number of "ones" contained in a word (typically the word size chosen would be eight (8) bits resulting in a lookup table of size two-hundred and fifty-six (256) entries). A word may be used as an index into an array (the lookup table) which may be either hard-coded or constructed within memory 1006 when needed. The value of every entry in the lookup table is equal to the number of set bits ("ones") in the corresponding index. Typically, there are less information carrying pixels than non-information carrying pixels (the background), where the percentage of the number information carrying pixels versus non-information carrying pixels is dependent on the content type. In one arrangement, a predetermined threshold for determining the information-carrying pixel value is one value for graphic type sub-bitmaps, and a different value for text type sub-bitmaps.

The method 500 proceeds to decision step 503, where the processor 1005 is used to determine if the sub-bitmap is of type "text". If the sub-bitmap is of type text, then at selection step 505, the text threshold value is selected for use by the processor 1005. Otherwise, at selection step 504, the graphics threshold value is selected for use by the processor 1005.

The method 500 then proceeds to decision step 507, where if the number of white pixels is less than the threshold (as determined at either step 504 or 505), then the method 50 proceeds to designating step 506. Otherwise, the method 500 proceeds to decision step 508.

At step 506, white pixels in the sub-bitmap are designated to be information carrying under execution of the processor 1005, and the method ends.

At step 508, if the ratio of black pixels is below the predetermined set threshold (as determined at either step 504 or 505), then the method 500 proceeds to designating step 509, where black pixels within the sub-bitmap are designated to be information carrying, and the method 500 ends. The predetermined threshold determined for use at either step 504 or 505 is likely to be significantly smaller than 0.5, meaning that there is a range of ratios of black versus white pixels symmetrically around 0.5 where no decision on which pixel is information carrying can be made using steps 507, 508, 506 and 509. In the case that the method 500 proceeds to assigning step 510, at which the sub-bitmap is changed to type "image", then at marking step 511, both black and white pixels are again deemed as information carrying effectively marking all pixels within the sub-bitmap as type "image". In many cases assigning the type "image" to a particular sub-bitmap still has an advantage as the sub-bitmap may be significantly smaller than the complete cumulative bitmap. The significance of the sub-bitmap being smaller than the cumulative bitmap and the effect this has on the attribute map will be described in detail below in the method 600. In summary, the sub-bitmap only affects the portion of the pixels in the cumulative bitmap and attribute map that the sub-bitmap overlaps in the cumulative bitmap.

In another arrangement, when no decision on the information carrying pixel value can be made in steps 507 and 508, step 510 is omitted and the original type assigned to the sub-bitmap is retained. Then at step 511, all pixels are marked to be information carrying, in which case the whole sub-bitmap ends up having all pixels marked as either text or graphics.

The method 600 of modifying each pixel in the attribute map corresponding to a pixel in a sub-bitmap, as executed at modifying step 308 of method 300 will now be described with reference to FIG. 6. The method 600 may be implemented as one or more software code modules of the software application program 1033 resident in the hard disk drive 1010 and being controlled in its execution by the processor 1005.

The method 600 begins at initialisation step 601, at which an iterator "i" for indexing the rows is initialised within the memory 1006 to zero, thereby selecting the first row in the sub-bitmap. Then, at initialisation step 602, an iterator "j" for indexing specific pixels within a row of the sub-bitmap (i.e. the column of the sub-bitmap that the pixel is contained in) is next initialised within the memory 1006 to zero, thereby selecting the first pixel in the current row of the sub-bitmap.

The method 600 then proceeds to step 603, in which an attribute value in the attribute bitmap corresponding to a current pixel is determined and assigned to the current pixel to assign a type (e.g., graphic, image or text) to the current pixel of the sub-bitmap. A method 700 of assigning a type to a pixel within an attribute map, as executed at step 603, will be described below with reference to FIG. 7. The method 700 is performed for every pixel in the current row, where the value of j is incremented at step 604.

Then at decision step 605, if the value j is less than the pixel width of the current sub-bitmap, then the method 600 returns to step 603. When all pixels in the current row have been processed, then at decision step 605 the method 600 instead proceeds to incrementing step 606 at which the iterator "i" is incremented and the next row of the sub-bitmap is selected. The method 600 again iterates over all rows of the sub-bitmap at decision step 607, where if the value of i is less than the height of the sub-bitmap, the method 600 returns to step 602. When all rows in the sub-bitmap have been iterated over, the method 600 ends.

As described above, each pixel in the attribute map that corresponds to a pixel in the sub-bitmap is processed and potentially modified in step 603.

The method 700 of assigning a type value to a pixel in an attribute map, as executed at step 603 in method 600, will now be described with reference to FIG. 7. The method 700 may be implemented as one or more software code modules of the software application program 1033 resident in the hard disk drive 1010 and being controlled in its execution by the processor 1005. The method 700 is used for determining whether to discard the attribute value for an identified pixel in the attribute map associated with a pixel in the sub-bitmap. The method 700 is also used for associating the attribute value of the sub-bitmap with information carrying pixels, while skipping attribute values for non-information carrying pixels.

The method 700 begins at determining step 701, at which the processor 1005 is used for determining, in the attribute map, a target pixel associated with a pixel in the sub-bitmap. The x and y coordinate of the target pixel in the attribute map is determined by adding an offset (i.e., j +x=offset_x, i+offset_y) specified in the segment for placing the sub-bitmap within the cumulative bitmap. The method 700 then proceeds to decision step 702, at which the processor 1005 is used to determine if the pixel in the sub-bitmap is information carrying. If the pixel in the sub-bitmap is information carrying, then the method 700 proceeds to setting step 705, at which the corresponding attribute value of the pixel in the attribute map is replaced with the type of the sub-bitmap, and the method 700 ends. If however, the value of the pixel in the sub-bitmap is distinct from the information carrying pixel value, then the method 700 proceeds instead to decision step 703.

At step 703, the processor 1005 is used for determining whether to discard or retain the attribute value for target pixel. In particular, at step 703, the processor 1005 is used to determine if the operator for combining the current sub-bitmap with the cumulative image is a REPLACE operator. If the operator is the REPLACE operator (i.e., all pixels in the sub-bitmap will replace the corresponding pixels in the cumulative bitmap), then the method 700 proceeds to clearing step 704 at which the attribute value of the corresponding attribute pixel is cleared (i.e., or "discarded"), and the method 700 ends. Accordingly, the processor 1005 is used for discarding the attribute value for the pixel of the attribute map identified at step 701, and substituting the attribute value for the pixel with the attribute value of the overlapping sub-bitmap. As described above, the attribute value of the corresponding attribute pixel is cleared (or "discarded") depending on the combination operator. The reason for clearing (or "discarding") the corresponding attribute pixel is due to the fact that the image data for the pixel is being unconditionally replaced without affecting the new value, thereby rendering previously determined attribute information irrelevant for that pixel. If the operator is anything else than REPLACE, then the method 700 immediately ends and the corresponding pixel in the attribute bitmap will be left unchanged.

In an alternative arrangement of the method 700, an attribute-map corresponding to the sub-bitmap (called a sub-attribute-map) is created and then composited with the attribute map using the following rules: If the combination operator is REPLACE, every pixel in the sub-attribute-map replaces the corresponding pixel in the attribute map within memory 1006. If the combination operator is anything other than REPLACE, every pixel in the sub-attribute-map that has an attribute value set is used to replace the corresponding pixel in the attribute map.

The methods described above will now be further described by way of example with reference to FIGS. 8A to 8H which show intermediate contents of both the attribute map and the cumulative bitmap for a sequence of segments being processed while decoding a JBIG2 image. The following paragraphs describe the example of FIGS. 8A to 8H step by step, with each step corresponding to a single iteration through steps 303, 304, 305, 306, 307 and 308 of method 300. Any blank areas in any of FIGS. 8A to 8H are set to 0, which for image data equates to white pixels and for attribute pixels equates to no attribute being set.

Figure 8A:
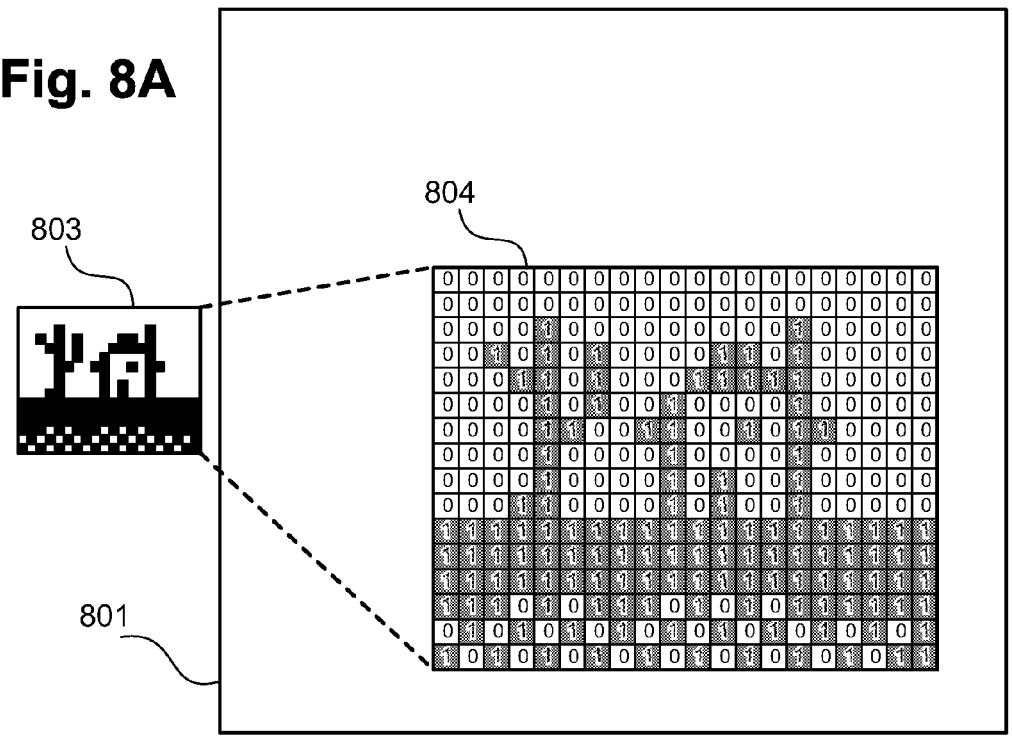
FIGS. 8A, 8C, 8E and 8G collectively show an example sequence of operations in which several sub-bitmaps are combined.
Figure 8B:
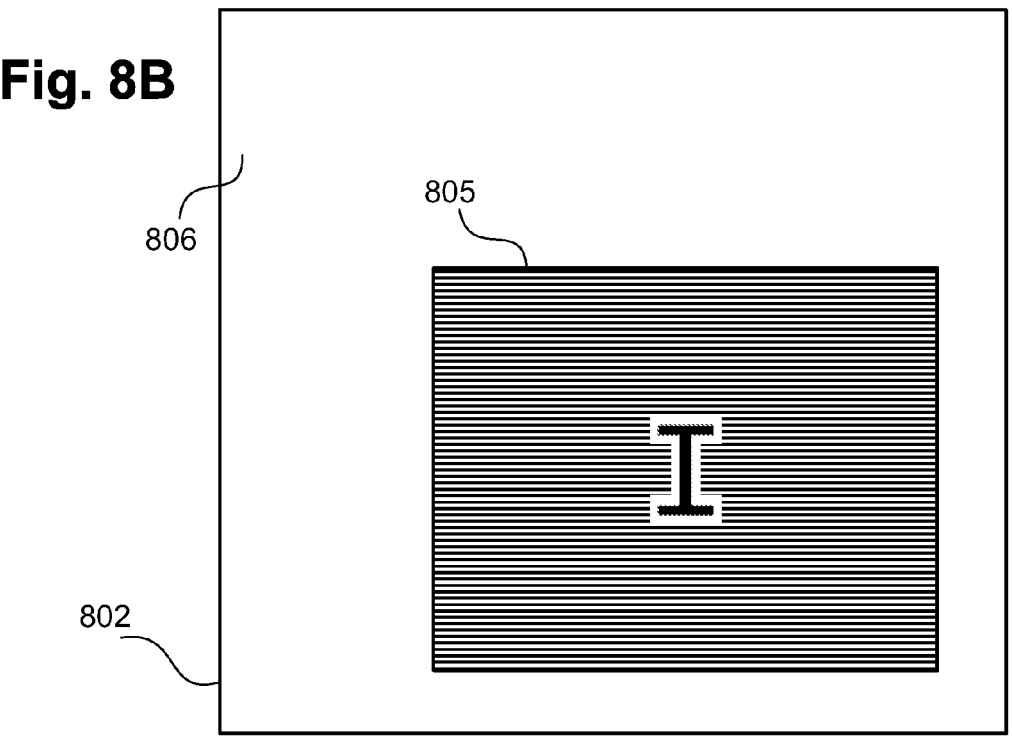
FIGS. 8B, 8D, 8F and 8H collectively show the attribute map corresponding to the example sequence of operations of FIGS. 8A, 8C, 8E and 8G.

FIG. 8A shows the placement, using an OR operation, of a sub-bitmap 803 onto cumulative bitmap 801 resulting in pixels 804 being set. FIG. 8B shows the cumulative bitmap 802 for the example sequence of segments. The corresponding pixels, 805, in the attribute bitmap, 802, are marked as type "image". The sub-bitmap is of type "image", therefore all pixels are information carrying, resulting in all the pixels corresponding to the sub-bitmap to be set to type "image". Pixels 806 in the attribute map outside the area of the sub-bitmap 803 remain unchanged.

Figure 8C:
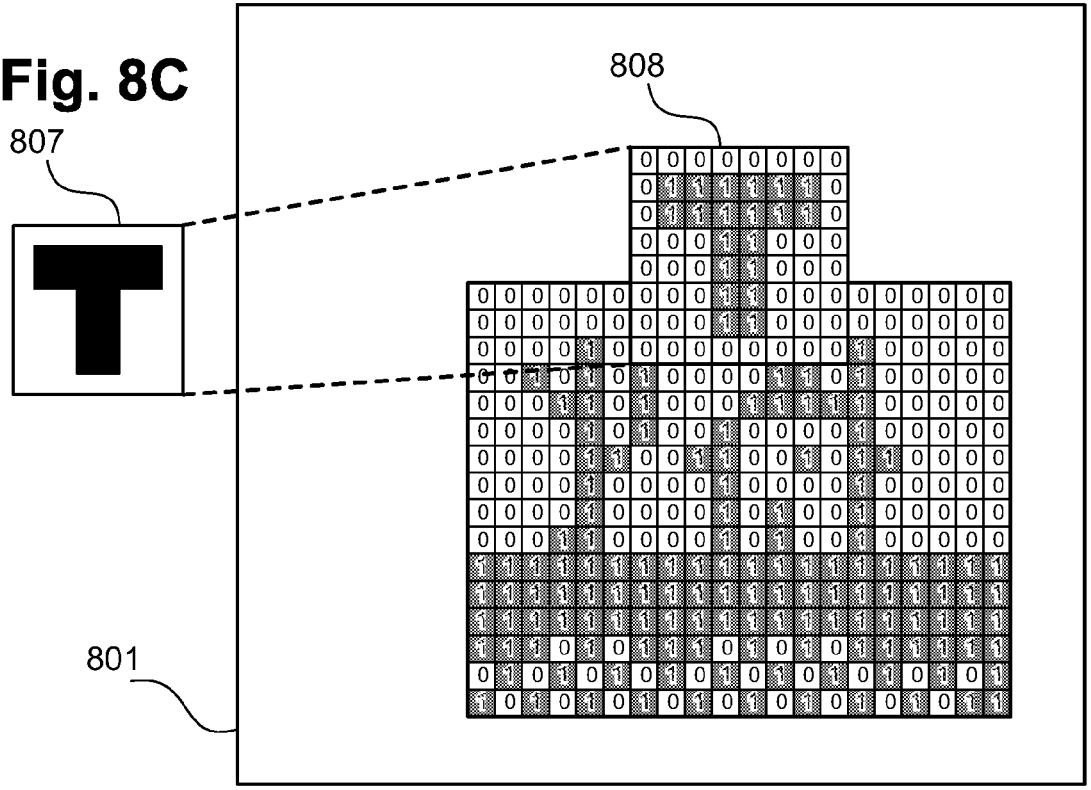
Figure 8D:
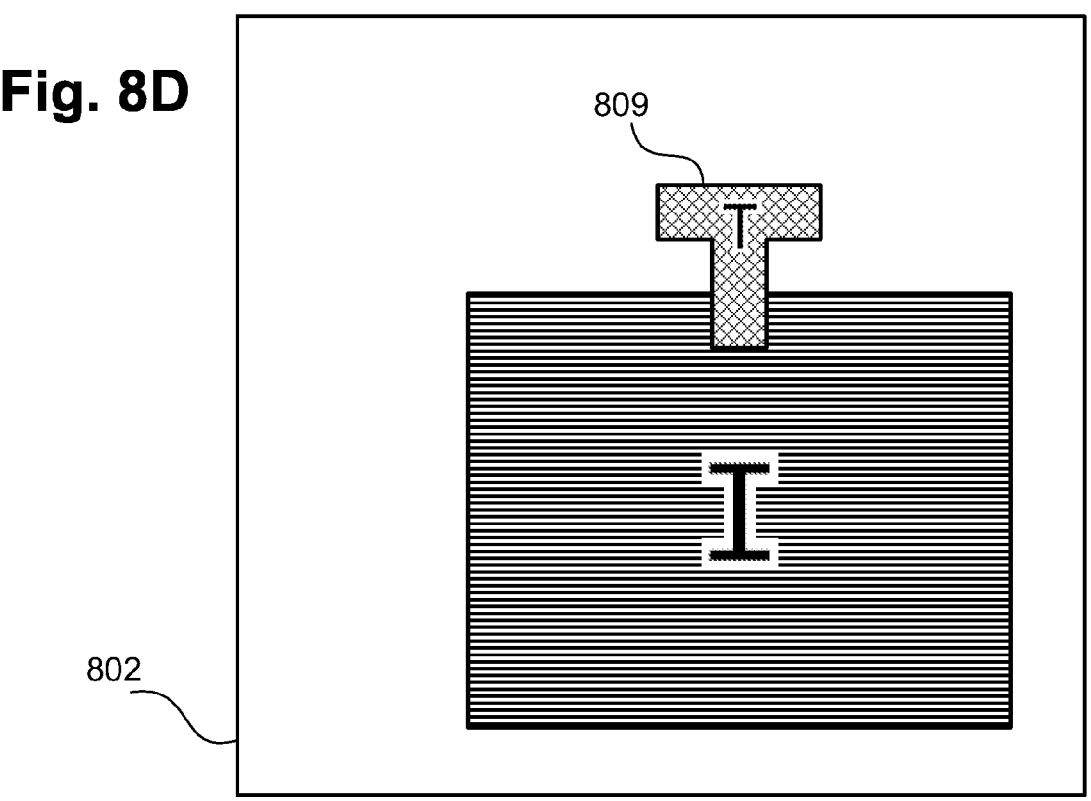

In FIG. 8C, a sub-bitmap of type "text", 807, is combined with cumulative bitmap 801 using an OR combination operation. Combining the sub-bitmap of type "text", [I]07, with cumulative bitmap 801 using an OR operation effectively causes only black pixels to affect the cumulative bitmap, seen in area 808. FIG. 8D shows the corresponding attribute bitmap, 802. In the example of FIGS. 8A to 8H, the black pixels forming the "T" in the text sub-bitmap are marked as information carrying (20 of 64 pixels are black), with the result that only attribute bits corresponding to the information carrying pixels 809 are modified in the attribute map.

Figure 8E:
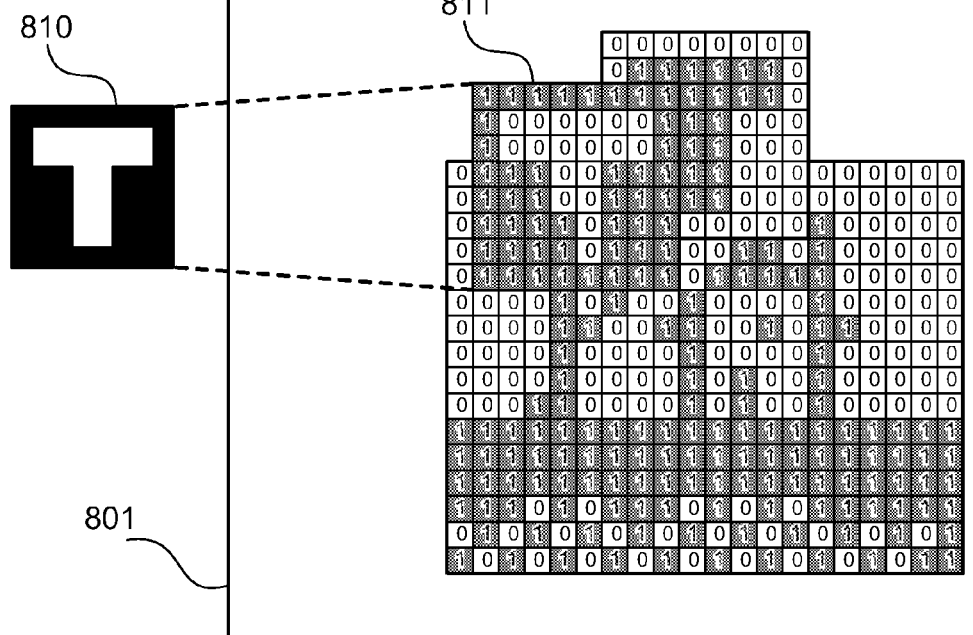
Figure 8F:
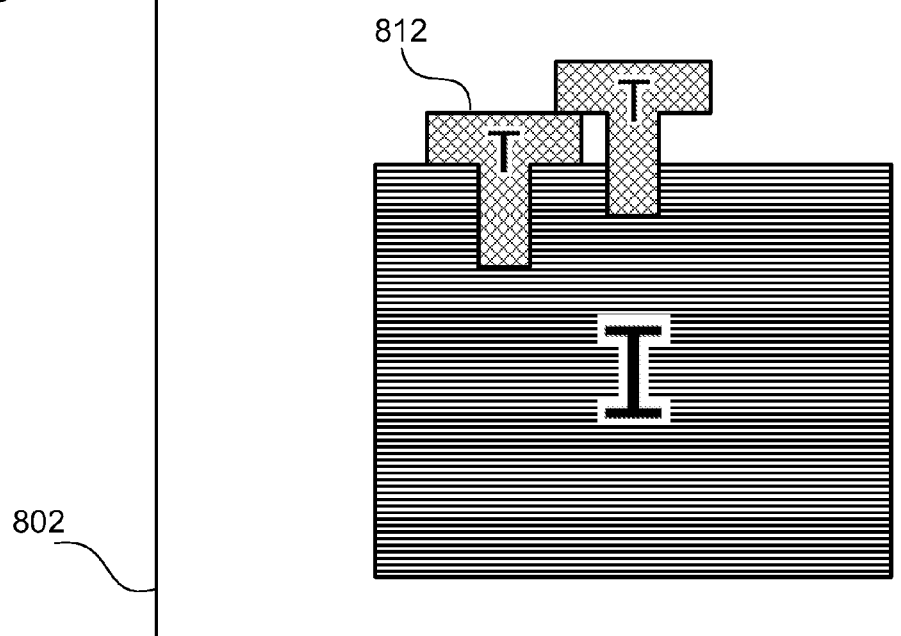

FIG. 8E shows the combining of a sub-bitmap, 810, of type "text" with the cumulative bitmap, 801, using an OR combination operation. In the example of FIG. 8E, the letter "T" is formed using white pixels, modifying the area 811 in the cumulative bitmap. Pixels that were already set as black in the cumulative bitmap 801 in the previous steps of the example sequence remain black, even when those pixels already set as black are overlapped by white pixels in the sub-bitmap 810 due to the characteristic of an OR combination operation only being able to set bits and not able to clear bits. In the example of FIG. 8E, the white pixels in the sub-bitmap, 810, are information carrying, therefore only the attribute pixels, 812, corresponding to the information carrying pixels are modified in the attribute bitmap 802 shown in FIG. 8F.

Figure 8G:
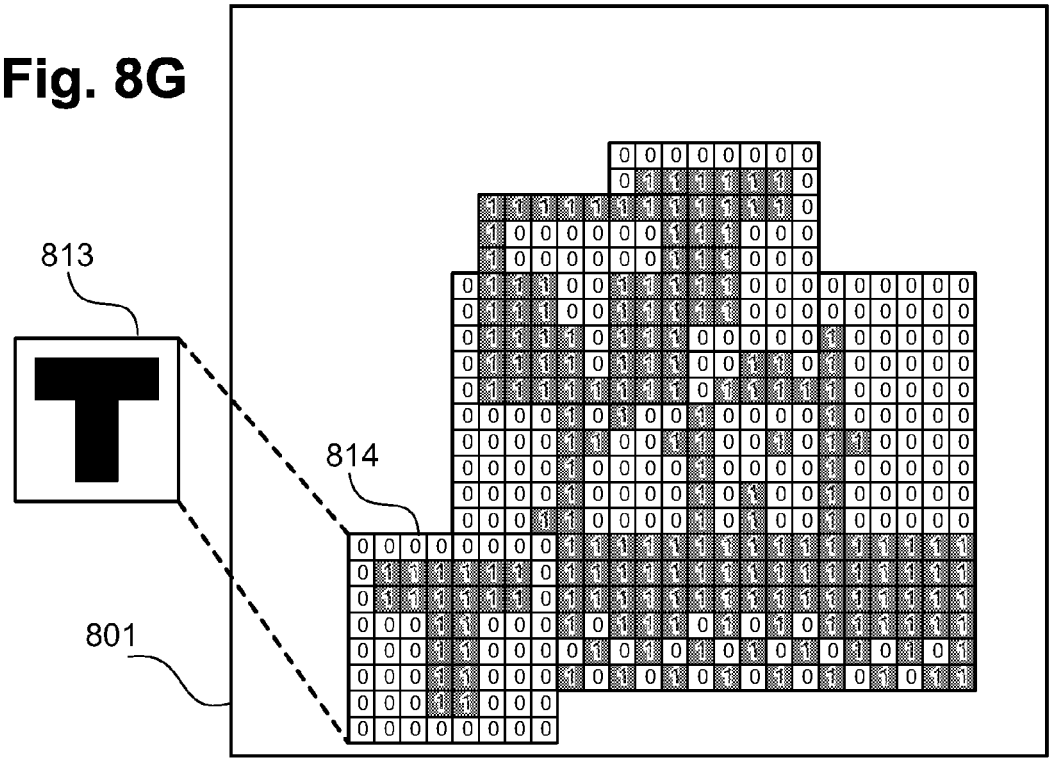
Figure 8H:
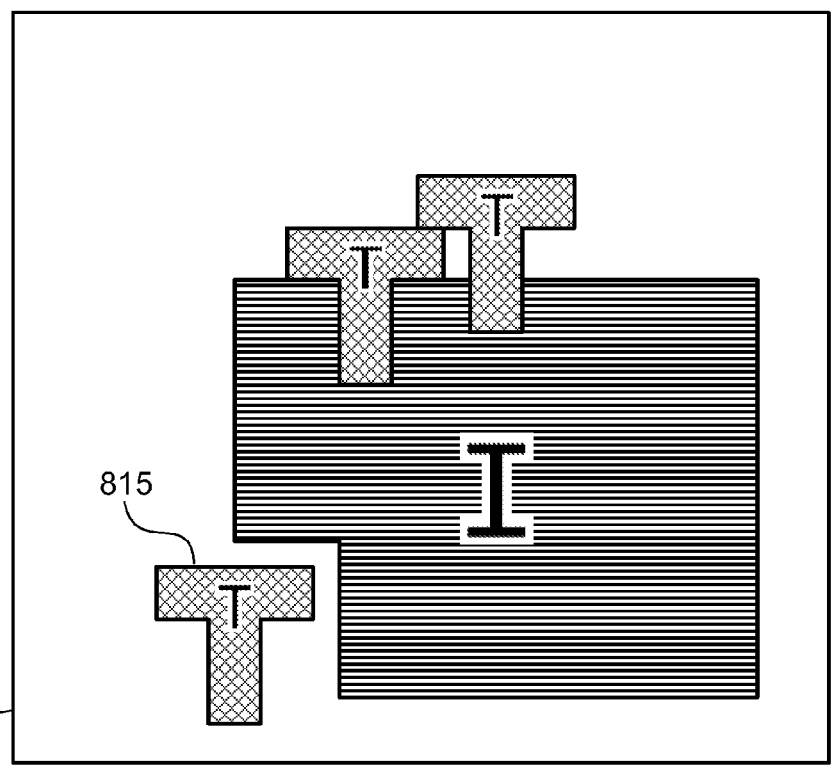

In FIG. 8G a sub-bitmap, 810, is again combined with the cumulative bitmap, 801. However, in FIG. 8G, the REPLACE operator results in the modified pixels shown in the area 814. Cumulative bitmap pixels that were already set as black in previous steps of the method 300 are replaced with their values from the current sub-bitmap 810, in some cases returning the cumulative bitmap pixels to white. Also, in the step of the example sequence shown in FIG. 8G, the black pixels of the letter "T" are again marked as information carrying, however, because of the REPLACE operator, the attribute values for the pixels around the non-information carrying pixels in the sub-bitmap 810 are cleared in the attribute bitmap 802 as seen in the area surrounding 815.

Figure 9A:
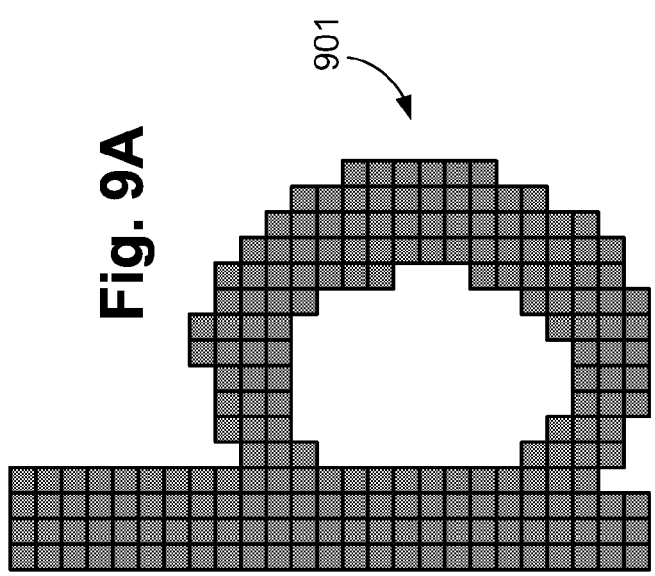
FIG. 9A shows an example "text" sub-bitmap.
Figure 9B:
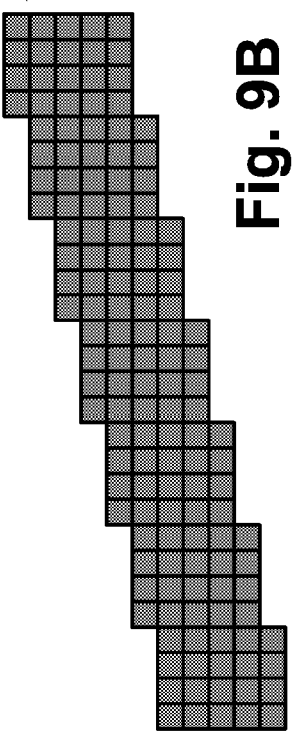
FIG. 9B shows an example "graphic" sub-bitmap.
Figure 9C:
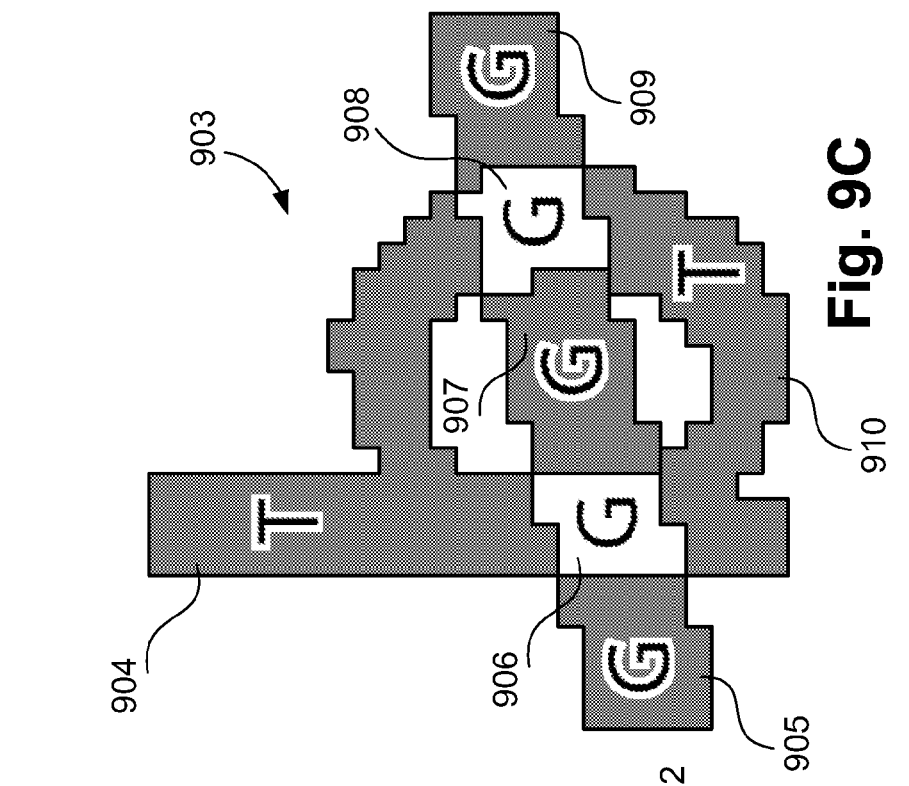
FIG. 9C shows the cumulative bitmap and attribute map for the example text sub-bitmap and the example graphics sub-bitmap combined with an XOR operator.

A further example is shown in figures FIG. 9A, FIG. 9B and FIG. 9C.

In the example of FIGS. 9A, 9B and 9C, sub-bitmap 901 in FIG. 9A is of type "text" and contains the letter "b" in black on a white background. The black pixels (i.e. pixels corresponding to the letter "b") in 901 are found to be information carrying at step 509 within the sub-bitmap 901.

Sub-bitmap 902 in FIG. 9B is of type "graphics" and contains a black diagonal bar on a white background. Again, the black pixels (i.e. pixels corresponding to the bar) are found to be information carrying at step 509 within the sub-bitmap 902. The borders of both sub-bitmap 901 and 902 are not shown, as the borders do not affect the outcome of the example of FIGS. 9A, 9B and 9C. However, sub-bitmaps are rectangular in shape and are placed on the cumulative bitmap in an upright position, using only an x and y offset for positioning.

FIG. 9C shows the result 903 of first combining sub-bitmap 901 with an all-white cumulative bitmap using an XOR operator and then combining sub-bitmap 902 with the cumulative bitmap, also using an XOR operator. Areas 904 and 910 receive contribution only from information carrying pixels from text sub-bitmap 901, and are assigned type text in the attribute bitmap. In the example of FIG. 9C, the regions 906 and 908 where black was XORed with black have turned white in the cumulative bitmap. However, areas 905, 906, 907, 908 and 909 are all set to type graphics regardless of the colour as the areas 905, 906, 907, 908 and 909 were information carrying pixels in sub-bitmap 902. Because the combination operator is XOR and not REPLACE, region 904 and 910 in the cumulative bitmap not corresponding to the information carrying pixels in the sub-bitmap 902 remain unchanged after combining.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of generating an attribute map for processing an image by an image processing device, the method comprising:

Receiving, by a computing device, an image encoded into a plurality of segments, each segment being characterised by a position within a base region associated with the image and being encoded according to a corresponding encoding format;

decoding, by the computing device, a segment from the plurality of segments stored on a storage device into a sub-image, the sub-image being associated with a combination operation and an attribute value derived based on at least one of a segment decoding format and a segment encoding format, the combination operation determining a process of combining the sub-image with the underlying base region;

determining, by a computing device at least one information-carrying pixel in the sub-image based on the sub-image pixel content stored on the storage device and the attribute value associated with the sub-image; and generating, by the computer device, the attribute map for processing the image by the image processing device, the attribute map being generated using the attribute value associated with the sub-image for at least one pixel of the attribute map.

2. The method according to claim 1, further comprising determining, in the attribute map, a target pixel associated with a pixel in the sub-image having a value which is distinct from the information carrying pixel value of the sub-image.

3. The method according to claim 2, further comprising determining whether to discard the attribute value for the target pixel.

4. The method according to claim 2, further comprising discarding the attribute value for the target pixel.

5. The method according to claim 1, further comprising associating the attribute value of the sub-image with information-carrying pixels, while skipping attribute information for non-information carrying pixels.

6. The method according to claim 1, wherein the attribute value is discarded depending on a combination operation.

7. The method according to claim 1, further comprising combining, by the computing device, said sub-image and at least one other sub-image with the base region in a predetermined order, the order being defined during image encoding.

8. The method according to claim 1, further comprising substituting the attribute value in the attribute map with the attribute value of the overlapping sub-image for the information-carrying pixel in the overlapping sub-image.

9. The method according to claim 1, wherein a region within the attribute map corresponds to a region of the image overlapped by the sub-image according to an associated position and size.

10. The method according to claim 1, further comprising forming a decoded image by decoding the plurality of segments and combining associated sub-images according to the combination operation, position, and size of each segment.

11. The method according to claim 1, wherein a pixel value is associated with a pixel in the attribute map by locating a corresponding pixel in the sub-image and using a value of the corresponding pixel as the pixel value associated with the pixel in the attribute map, the corresponding pixel being determined using a position of the sub-image relative to the image, the position of the sub-image being determined based on the position of a corresponding segment.

12. The method according to claim 1, wherein a pixel value is information carrying based on a number of pixels having a particular pixel value within the sub-image relative to a number of all pixels within the sub-image, if the attribute value associated with the sub-image is text or graphics.

13. The method according to claim 1, wherein the attribute value is at least one of text, graphics and image.

14. The method according to claim 1, wherein all pixel values are information carrying if the attribute value associated with the sub-image is image.

15. The method according to claim 1, wherein the attribute map is generated in parallel with decoding at least one segment from the plurality of segments stored on the storage device.

16. The method according to claim 1, wherein the attribute map is generated based on a position of the information-carrying pixel in the sub-image.

17. A method of generating an attribute map for processing an image, the method comprising:

receiving, by a computing device, a plurality of image segments to be combined with a base region to produce said image, each segment being associated with a combination operation determining a process of combining the segments with the underlying base region, each segment being characterised by an attribute value derived based on a format used to produce the segment;

determining, by the computing device an information-carrying pixel value for one of said segments from the plurality of segments stored on a storage device;

determining, by the computing device, a target pixel in the attribute map corresponding to a pixel in said segment having a value which is distinct from the information carrying pixel value; and generating, by the computing device an attribute map stored on the storage device for processing the image using the attribute value associated with said segment for at least one pixel of the attribute map, wherein an existing attribute value in the attribute map is retained for said target pixel.

18. The method according to claim 17, wherein said format is at least one of an encoding format and a decoding format.

19. An apparatus for generating an attribute map for processing an image, the apparatus comprising:

means for receiving an image encoded into a plurality of segments, each segment being characterised by a position within a base region associated with the image and being encoded according to a corresponding encoding format;

means for decoding a segment from the plurality of segments into a sub-image, the sub-image being associated with a combination operation and an attribute value derived based on at least one of a segment decoding format and a segment encoding format, the combination operation determining a process of combining the sub-image with the underlying base region;

means for determining at least one information-carrying pixel in the sub-image based on the sub-image pixel content and the attribute value associated with the sub-image; and means for generating the attribute map for processing the image, the attribute map being generated using the attribute value associated with the sub-image for at least one pixel of the attribute map.

20. An apparatus for generating an attribute map for processing an image, the apparatus comprising:

means for receiving a plurality of image segments to be combined with a base region to produce said image, each segment being associated with a combination operation determining a process of combining the segments with the underlying base region, each segment being characterised by an attribute value derived based on a format used to produce the segment;

means for determining an information-carrying pixel value for one of said segments from the plurality of segments;

means for determining a target pixel in the attribute map corresponding to a pixel in said segment having a value which distinct from the information carrying pixel value; and means for generating an attribute map for processing the image using the attribute value associated with said segment for at least one pixel of the attribute map, wherein at least an existing attribute value of the attribute map is retained for said target pixel.

21. A system for generating an attribute map for processing an image, the system comprising:
a memory for storing data and computer program;
a processor coupled to said memory for executing said computer program, said computer program comprising instructions for:
receiving an image encoded into a plurality of segments, each segment being characterised by a position within a base region associated with the image and being encoded according to a corresponding encoding format;
decoding a segment from the plurality of segments into a sub-image, the sub-image being associated with a combination operation and an attribute value derived based on at least one of a segment decoding format and a segment encoding format, the combination operation determining a process of combining the sub-image with the underlying base region;
determining at least one information-carrying pixel in the sub-image based on the sub-image pixel content and the attribute value associated with the sub-image; and generating the attribute map for processing the image, the attribute map being generated using the attribute value associated with the sub-image for at least one pixel of the attribute map.

22. A system for generating an attribute map for processing an image, the system comprising:
a memory for storing data and computer program;
a processor coupled to said memory for executing said computer program, said computer program comprising instructions for:
receiving a plurality of image segments to be combined with a base region to produce said image, each segment being associated with a combination operation determining a process of combining the segments with the underlying base region, each segment being characterised by an attribute value derived based on a format used to produce the segment;
determining an information-carrying pixel value for one of said segments from the plurality of segments;
determining a target pixel in the attribute map corresponding to a pixel in said segment having a value which distinct from the information carrying pixel value; and
generating an attribute map for processing the image using the attribute value associated with said segment for at least one pixel of the attribute map, wherein at least an existing attribute value of the attribute map is retained for said target pixel.

23. A non-transitory computer readable medium having a computer program stored thereon for generating an attribute map for processing an image, the computer program comprising:

code for receiving an image encoded into a plurality of segments, each segment being characterised by a position within a base region associated with the image and being encoded according to a corresponding encoding format;

code for decoding a segment from the plurality of segments into a sub-image, the sub-image being associated with a combination operation and an attribute value derived based on at least one of a segment decoding format and a segment encoding format, the combination operation determining a process of combining the sub-image with the underlying base region;

code for determining at least one information-carrying pixel value in the sub-image based on the sub-image pixel content and the attribute value associated with the sub-image; and code for generating the attribute map for processing the image, the attribute map being generated using the attribute value associated with the sub-image for at least one pixel of the attribute map.

24. A non-transitory computer readable medium having a computer program stored thereon for method of generating an attribute map for processing an image, the program comprising:
code for receiving a plurality of image segments to be combined with a base region to produce said image, each segment being associated with a combination operation determining a process of combining the segments with the underlying base region, each segment being characterised by an attribute value derived based on a format used to produce the segment;
code for determining an information-carrying pixel value for one of said segments from the plurality of segments;
code for determining a target pixel in the attribute map corresponding to a pixel in said segment having a value which distinct from the information carrying pixel value; and
code for generating an attribute map for processing the image using the attribute value associated with said segment for at least one pixel of the attribute map, wherein at least an existing attribute value of the attribute map is retained for said target pixel.

25. A method of generating an attribute map for processing an image, the method comprising:
receiving, by a computing device, a plurality of image segments to be combined with a base region to produce said image, each segment being associated with a combination operation determining a process of combining the segments with the underlying base region, each segment being characterised by a segment attribute value derived based on a format used to produce the segment;
determining, by the computing device, an information-carrying pixel and a non-information-carrying pixel for one of said segments from the plurality of segments stored on a storage device;
determining, by the computing device, a first pixel location corresponding to the information carrying pixel and a second location corresponding to the non-information carrying pixel; and
generating, by the computing device, the attribute map stored on the storage device for processing the image, by the image processing device, using the segment attribute value for the first location and retaining an existing attribute value for the second location.

* * * * *